(12) United States Patent
Hayashi et al.

(10) Patent No.: US 6,724,607 B2
(45) Date of Patent: Apr. 20, 2004

(54) DRIVING APPARATUS OF VIBRATION TYPE ACTUATOR

(75) Inventors: Tadashi Hayashi, Kanagawa (JP); Shinji Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 09/962,312

(22) Filed: Sep. 26, 2001

(65) Prior Publication Data

US 2002/0053858 A1 May 9, 2002

(30) Foreign Application Priority Data

| Sep. 28, 2000 | (JP) | 2000-296426 |
| Nov. 1, 2000 | (JP) | 2000-334989 |
| Jul. 31, 2001 | (JP) | 2001-232256 |

(51) Int. Cl.$^7$ ............................................. H01H 47/00
(52) U.S. Cl. ............................ 361/171; 310/316.01
(58) Field of Search .................. 361/159, 160, 361/171; 310/314, 316.01, 316.02, 317, 319

(56) References Cited

U.S. PATENT DOCUMENTS

| 5,484,216 | A | 1/1996 | Kimura et al. ............ 400/319 |
| 5,889,350 | A | 3/1999 | Yamamoto ................. 310/316 |
| 5,939,851 | A | 8/1999 | Kataoka et al. ............ 318/611 |
| 6,049,156 | A | 4/2000 | Yamamoto et al. ..... 310/316.01 |
| 6,054,795 | A | 4/2000 | Yamamoto et al. ..... 310/316.01 |
| 6,084,334 | A | 7/2000 | Yamamoto et al. ..... 310/316.01 |
| 6,100,622 | A | 8/2000 | Yamamoto et al. ..... 310/316.01 |
| 6,121,714 | A | * 9/2000 | Atsuta ................... 310/316.01 |
| 6,133,671 | A | 10/2000 | Atsuta et al. .......... 310/316.01 |
| 6,229,402 | B1 | * 5/2001 | Kataoka et al. ............... 331/34 |
| 6,313,564 | B1 | 11/2001 | Kataoka et al. ........ 310/316.01 |

FOREIGN PATENT DOCUMENTS

| JP | 2-179282 | 7/1990 |
| JP | 8-33364 | 2/1996 |
| JP | 9-271174 | 10/1997 |
| JP | 11-178364 | 7/1999 |

* cited by examiner

Primary Examiner—Michael Sherry
Assistant Examiner—Gary L. Laxton
(74) Attorney, Agent, or Firm—Fitzpatrick, Cella, Harper & Scinto

(57) ABSTRACT

A driving apparatus of a vibration type actuator includes an apparatus for forming a vibration wave by applying four-phase AC signals having temporal phase differences to four-phase driving phases arranged at intervals of ¼ wavelength, which includes first and second transformers and two-phase driving phases connected to the secondary terminals of the respective transformers, thereby simplifying the arrangement of a driving circuit.

21 Claims, 25 Drawing Sheets

DRIVING APPARATUS OF VIBRATION TYPE ACTUATOR

BACKGROUND OF THE INVENTION

1. Field of the Invention

The present invention relates to a driving circuit for a vibration type actuator used in the driving unit of an image forming apparatus or the like.

2. Related Background Art

A vibration type actuator has, as a basic component, a vibration member formed by bonding a piezoelectric element serving as an electro-mechanical energy conversion element to an elastic member such as a metal member exhibiting small damping of vibrations or a vibration member formed by sandwiching a piezoelectric element between elastic members. A driving circuit applies a driving signal as a cyclic signal to the piezoelectric element to drive the vibration member at a frequency near the resonance frequency, thereby relatively driving the vibration member and a contact member pressed against the vibration member.

According to a vibration member of the above type formed by bonding a piezoelectric element to an elastic member, in general, a plurality of piezoelectric elements are arranged on one surface of, for example, a ring- or disk-like elastic member, and some combinations (to be referred to as phases) of piezoelectric elements are made to obtain a plurality of phases. Driving signals are applied to these phases with temporal phase shifts to form standing waves. By synthesizing these standing waves, a traveling wave is produced in the vibration member, thereby driving a contact member, e.g., a moving member, which is pressed against the surface opposite the surface to which the piezoelectric elements are bonded.

As shown in FIGS. 4, 7, 8, 9, 10, and 11 in Japanese Patent Application Laid-Open No. 8-33364, FIG. 1 in Japanese Patent Application Laid-Open No. 9-271174, and FIG. 3 in Japanese Patent Application Laid-Open No. 11-178364, a conventional driving circuit of a vibration type actuator is comprised of a switching circuit, transformer, pulse generating circuit, and DC power supply. Each circuit is designed to generate a relatively large AC driving signal on the secondary side of the transformer by turning on/off a current supplied from the DC power supply to the transformer at the driving frequency by using the switching circuit.

Such a driving circuit requires switching circuits, transformers, and pulse generating circuits equal in number to the number of phases. For example, for a driving circuit of a two-phase driving vibration type actuator, the circuit shown in FIG. 17 is used. A driving circuit of a four-phase driving vibration type actuator becomes large in scale, as shown in FIG. 18.

Referring to FIGS. 17 and 18, these circuits include transformers 501 to 506, MOSFETs 550 to 573, driving phases 510 to 515 of vibration type actuators, and power supplies 530 and 531. In the circuits shown in FIGS. 17 and 18, pulse generating circuits are not illustrated. In practice, all the gates of the MOSFETs are connected to the pulse generating circuit, and driving signals having a driving frequency are input to switch the direction of a current flowing in the primary coil of the transformer.

Assume that in the driving circuit of the two-phase driving vibration type actuator shown in FIG. 17, the vibration member of the vibration type actuator is formed, for example, by joining a piezoelectric element to one surface of a ring-like elastic member, and a plurality of standing waves having a wavelength $\lambda$ are formed in the two phases. In this case, a plurality of regions having different directions of polarization from each other are formed in the ring-like piezoelectric element at intervals of $\frac{1}{2}\lambda$ (half wavelength), and regions which are polarized in one direction are defined as one phase, such as phase 510. That is, at intervals of $\frac{1}{2}\lambda$ the phase alternates between one phase 510 and the other phase 511. AC voltages, which are AC signals having a temporal phase shift, are applied to one phase 510 and the other phase 511. Note that in-phase AC voltages are applied to adjacent electrodes, forming polarized regions having different polarities at intervals of a half wavelength, which constitute the respective phases.

A switching circuit for one phase 510 is comprised of the MOSFETs 550 to 553, and a switching circuit for the other phase 511 is comprised of the MOSFETs 554 to 557. The pulse generating circuits (not shown) output pulse signals, each signal having a pulse waveform with a predetermined timing, to the respective MOSFETs in the two switching circuits in accordance with a driving frequency, and AC voltages boosted and wave-shaped by the transformers 501 and 502 are applied to the phases 510 and 511, respectively.

Assume that in the four-phase driving vibration type actuator shown in FIG. 18, the vibration member of the vibration type actuator is formed, for example, by joining a piezoelectric element to one surface of a ring-like elastic member, and a plurality of standing waves having a wavelength $\lambda$ are formed in each phase. In this case, regions of the same polarity are formed in the entire circumferential portion of the ring-like piezoelectric element at intervals of $\frac{1}{4}\lambda$ by using the electrodes. Of the electrodes, alternate electrodes (having intervals of a half wavelength) are defined as one phase, and the remaining alternate electrodes (having intervals of a half wavelength, i.e., having intervals of $\frac{1}{4}\lambda$ with respect to the first phase) are defined as the other phase. AC voltages having opposite phases are applied to the adjacent electrodes forming one phase. These electrodes are defined as positive phase 512 and negative phase 513. Likewise, AC voltages having opposite phases are applied to the adjacent electrodes forming the respective regions of the other phase. These electrodes are defined as positive phase 514 and negative phase 515.

Switching circuits are comprised of the MOSFETs 558 to 561, MOSFETs 562 to 565, MOSFETs 566 to 569, and MOSFETs 570 to 573. The pulse generating circuit (not shown) outputs pulse signals, each signal having a pulse waveform with a predetermined timing in accordance with a driving frequency, to the respective MOSFETs in the four switching circuits. As a consequence, AC voltages boosted and wave-shaped by the transformers 503, 504, 505, and 506 are applied to the phases 512, 513, 514, and 515, respectively.

A conventional vibration type driving circuit requires a pulse generating circuit, and transformers and switching circuits for the respective phases. This circuit is disadvantageous in terms of cost and space when it is applied to a multi-phase actuator such as a four-phase driving vibration type actuator, in particular.

In addition, as the number of phases increases, the elements constituting a driving circuit vary, resulting in variations in output voltage. This may affect the characteristics of the actuator or its service life.

SUMMARY OF THE INVENTION

According to one aspect of the application, it is an object to provide a circuit for driving a four-phase driving vibration type actuator, which can attain a reduction in cost and space saving without increasing the number of parts, and a driving circuit which exhibits a small variation in output voltage between phases without any special adjustment.

According to one aspect of the application, it is an object to provide a driving circuit of a vibration type actuator, which is adjusted to efficiently drive a moving member without increasing the number of parts.

According to one aspect of the application, there is provided a driving apparatus of a four-phase driving vibration type actuator for applying four-phase AC signals having temporal phase differences to four-phase driving phases arranged on an electro-mechanical energy conversion element of a vibration member at intervals of ¼ a wavelength of a resonance vibration, thereby forming a traveling wave by synthesizing a standing wave formed by one pair of two-phase driving phases at a position of a half wavelength with a standing wave formed by the other pair of two-phase driving phases. The driving apparatus comprises a pulse generating circuit for generating a pulse in accordance with a driving frequency, a first switching circuit for outputting an AC voltage to a first transformer by ON/OFF-controlling a switching element in accordance with a pulse from the pulse generating circuit, and a second switching circuit for outputting an AC voltage to a second transformer by ON/OFF-controlling the switching element in accordance with a pulse from the pulse generating circuit. One pair of two-phase driving phases is connected to two ends of a secondary side of the first transformer, the other pair of two-phase driving phases is connected to two ends of the secondary side of the second transformer, and the pulse generating circuit outputs pulses to the first and second switching circuits with a phase difference of 90°.

According to one aspect of the application, there is provided a driving apparatus of a vibration type actuator for forming a traveling wave by synthesizing a plurality of standing waves formed by applying AC signals with a temporal phase difference to an electro-mechanical energy conversion element of a vibration member. The driving apparatus comprises two inductors respectively formed on secondary sides of first and second transformers for generating AC voltages, the inductors being set to satisfy $$fr < (fre/\sqrt{2}) < fs$$

where fre is a parallel resonance frequency of an inductance of the inductors and a capacitance of the electro-mechanical energy conversion element, fr is a resonance frequency of the vibration member, and fs is a frequency at which a vibration amplitude of the vibration member increases for the first time in a region higher than the resonance frequency fr.

According to one aspect of the application, there is provided a driving apparatus of a vibration type actuator for generating a standing wave by applying an AC signal to an electro-mechanical energy conversion element of a vibration member. The driving apparatus comprises a transformer for outputting an AC voltage, and an inductor formed on a secondary side of the transformer, the inductor being set to satisfy $$fr < (fre/\sqrt{2}) < fs$$

where fre is a parallel resonance frequency of an inductance of the inductor and a capacitance of the electro-mechanical energy conversion element, fr is a resonance frequency of the vibration member, and fs is a frequency at which a vibration amplitude of the vibration member increases for the first time in a region higher than the resonance frequency fr.

The above and other objects, features, and advantages of the present invention will be apparent from the following detailed description in conjunction with the accompanying drawings and the appended claims.

DETAILED DESCRIPTION OF THE PREFERRED EMBODIMENTS

First Embodiment

Figure 13:
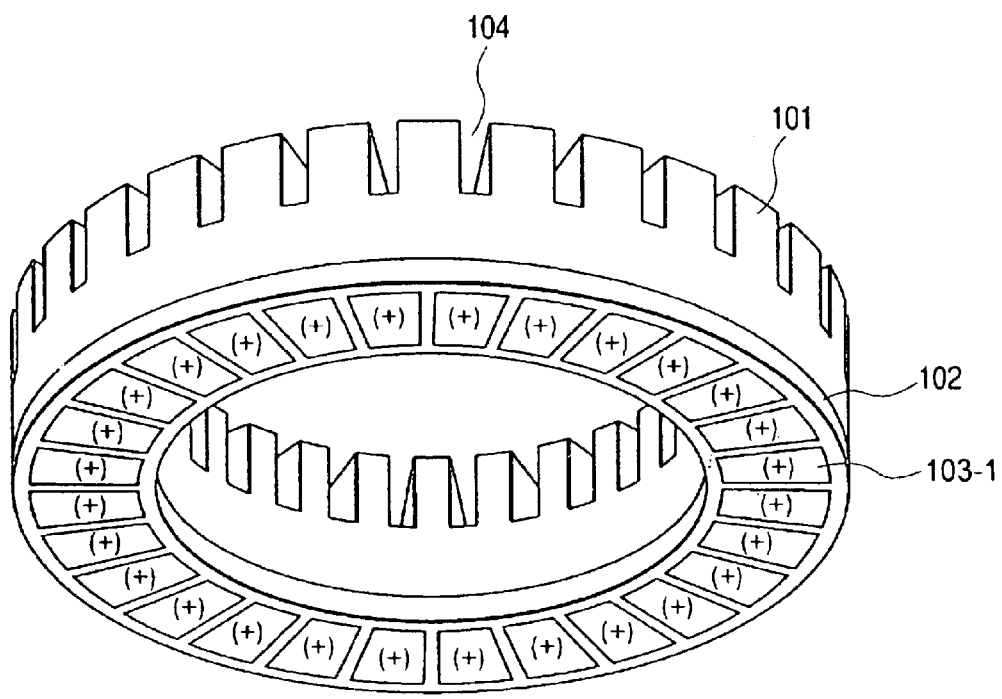
FIG. 13 is a perspective view of the vibration member of a four-phase driving vibration type actuator to which the present invention is applied.

A four-phase driving vibration type actuator will be described first. As shown in FIG. 13, according to the vibration member in this embodiment, a plurality of displacement increasing grooves 104 are radially formed at equal intervals in a metal elastic member 101 having an annular shape along the circumferential direction to increase circumferential displacements caused by bending vibrations. On the surface of the elastic member 101 opposite the surface in which the grooves 104 are formed, an annular piezoelectric element 102 is fixed by using an adhesive, brazing, or the like.

Figure 14A:
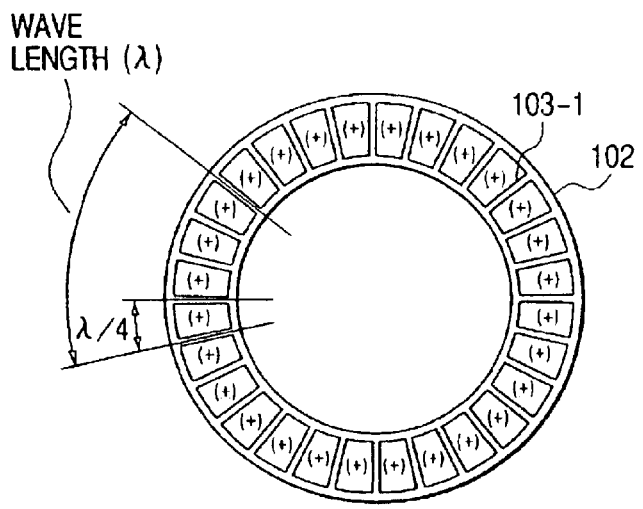
FIG. 14A is a view showing the polarization pattern of a piezoelectric element in FIG. 13.
Figure 14B:
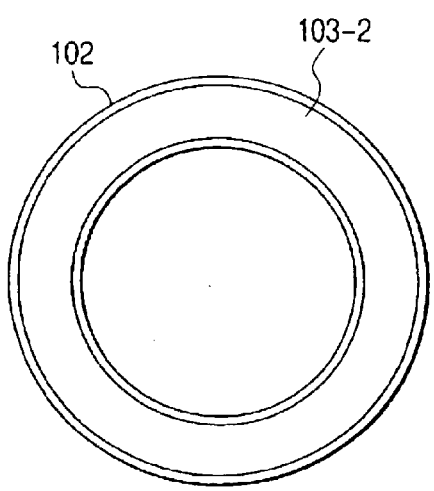
FIG. 14B is a view showing a full-face electrode on an opposite surface.

FIGS. 14A and 14B show the electrodes of the piezoelectric element 102 of this embodiment and its polarization pattern. FIG. 14A shows a pattern on the electrode surface. FIG. 14B shows the backside surface of a common electrode surface. The common electrode surface is fixed to the elastic member 101, and a common electrode 103-2 is electrically connected to the elastic member 101.

Electrodes 103-1 and the polarization pattern shown in FIG. 14A will be described below. The vibration member of this embodiment uses a vibration mode $7\lambda$, with the wavelength of a standing wave being represented by $\lambda$, in which seven bending deformations are caused per revolution by circumferential expansion/contraction of the piezoelectric element. The respective electrodes are polarized in the same direction (polarization pattern) and formed at $\lambda/4$ intervals.

Figure 15A:
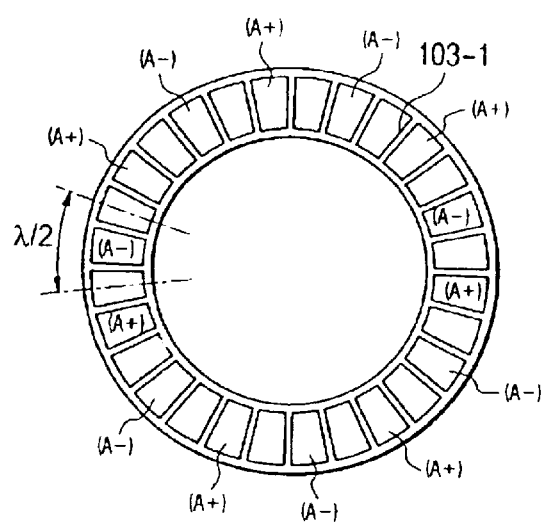
FIG. 15A is a view showing the A phases of the piezoelectric element in FIG. 13.
Figure 15B:
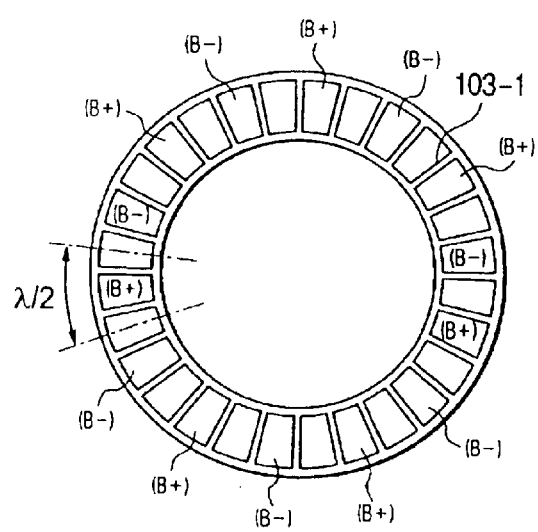
FIG. 15B is a view showing the B phases of the piezoelectric element in FIG. 13.

FIG. 15A shows A phase driving electrodes and the positions of nodes in an A phase standing wave driving operation. FIG. 15B shows B phase driving electrodes and the positions of nodes in a B phase standing wave driving operation.

Referring to FIG. 15A, the regions denoted by reference symbols (A+) and (A−) correspond to A phase driving electrodes. Alternating voltages having opposite phases are applied to the (A+) electrodes and (A−) electrodes, respectively. The dotted lines indicate the positions of nodes in an A phase standing wave driving operation.

Fourteen A phase pattern electrodes are evenly arranged, one at each half wavelength ($\lambda/2$), at positions where the maximum peak vibration amplitudes of the antinodes occur, in order to excite the A phase vibration mode.

The B phase pattern electrodes shown in FIG. 15B are evenly arranged at a pitch of $\lambda/2$, each at a position shifted from a corresponding position of the A phase pattern by $\lambda/4$, in order to excite a seventh-order vibration mode at a position where the positional phase is shifted from that of the A phase by ¼ wavelength ($\lambda/4$).

To arrange the A and B phase patterns on the same circumference, each of the A and B phase pattern electrodes has the shape of a sector with an angular length of $\lambda/4$.

All the A and B phase pattern electrodes are polarized to the same polarity in the direction of thickness as indicated by reference symbols (+) in FIG. 14A.

Figure 16:
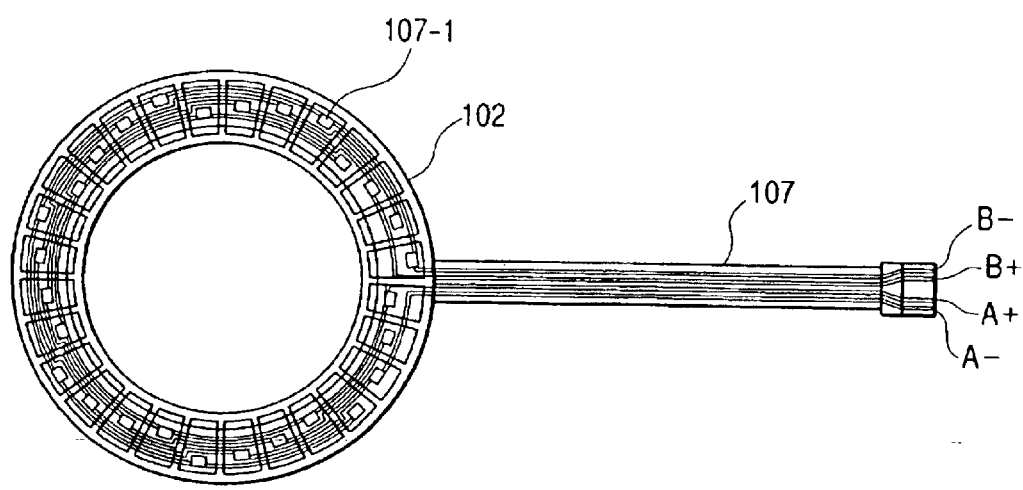
FIG. 16 is a view showing a power feed member for the piezoelectric element in FIG. 13.

FIG. 16 shows a power feed method for the piezoelectric element 102 in this embodiment. A flexible printed board 107 for applying voltages is bonded to the piezoelectric element 102 with an adhesive or the like. The feed electrodes of the flexible printed board 107 are grouped into four types of electrodes, namely (A+), (B+), (A−), and (B−) electrodes. Lands 107-1 serving as electrode exposure portions of each group of electrodes short-circuit the pattern electrodes of the piezoelectric element at a pitch of wavelength $\lambda$.

The vibration member of this embodiment is driven as follows. Alternating voltages having a temporal phase difference of 90° are applied between the (A+) and (B+) electrodes and between the (A−) and (B−) electrodes.

Since the (A+) and (A−) electrodes of the piezoelectric element are connected in series through the common electrode on the fixed surface of the piezoelectric element, the polarized regions polarized to the same polarity on the element are electrically connected in reverse, and the respective polarized regions connected to the (A+) and (A−) electrodes produce expansion/contraction forces with opposite phases.

In this manner, A and B phase standing waves are excited with a positional phase difference of $\lambda/4$ and a temporal phase difference of 90°, and the standing waves are synthesized to excite a traveling vibration wave.

In the four-phase driving vibration type actuator, since piezoelectric elements are uniformly arranged on the entire circumference of the annular elastic member uniformly polarized in the same direction, forming the vibration member, the synthetic vibration amplitude distribution can be made uniform throughout the circumference.

Figure 1:
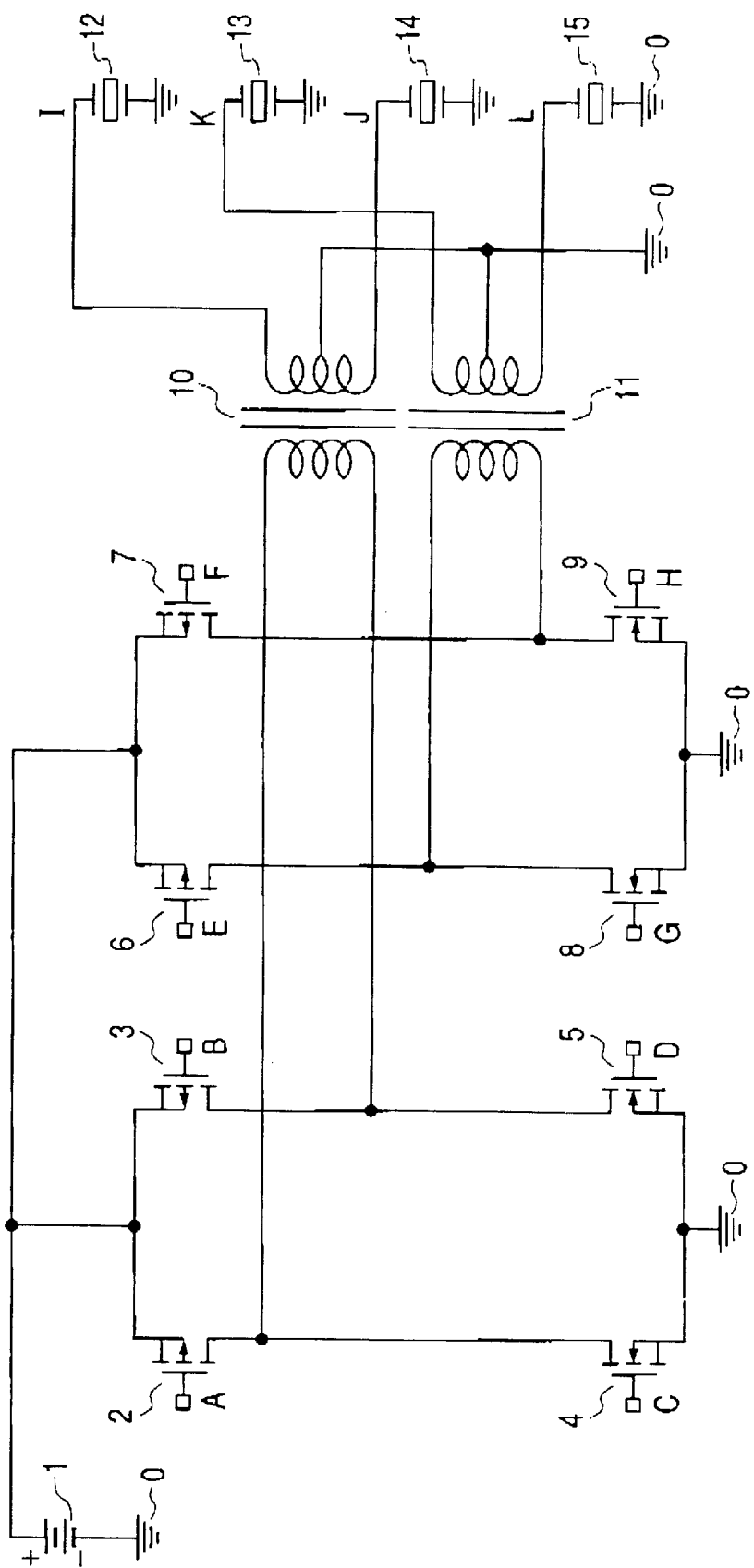
FIG. 1 is a circuit diagram showing the first embodiment of the present invention.

FIG. 1 shows the arrangement of a driving circuit according to an embodiment of the present invention for such a four-phase driving vibration type actuator.

This arrangement includes a DC power supply 1, MOSFETs 2 to 9, transformers 10 and 11, and driving phases 12 to 15 of the vibration type actuator.

The MOSFETs 2 to 5 are connected in the manner shown in FIG. 1 to form a first switching circuit, and the MOSFETs 6 to 9 are connected in the manner shown in FIG. 1 to form a second switching circuit. The first switching circuit is connected to the primary side of the first transformer 10. The second switching circuit is connected to the primary side of the second transformer 11.

The driving phase 12 corresponds to the (A+) electrode in FIG. 15A. The driving phase 13 corresponds to the (B+) electrode in FIG. 15B. The driving phase 14 corresponds to the (A−) electrode in FIG. 15A. The driving phase 15 corresponds to the (B−) electrode in FIG. 15B.

Middle points (referred to as center taps) are set on the inductances on the secondary sides of the first and second transformers 10 and 11. These center taps are grounded. The inductances of the first and second transformers 10 and 11 are adjusted to attain impedance matching with the capacitances of driving phases.

Note that each center tap is a middle point of the inductance but is not necessarily a middle point of the winding.

The driving phase 12 at the 0° position corresponding to the (A+) electrode and the driving phase 14 at the 180° position corresponding to the (A−) electrode are respectively connected to the two ends of the secondary side of the first transformer 10. The driving phase 13 at the 90° position corresponding to the (B+) electrode and the driving phase 15 at the 270° position corresponding to the (B−) electrode are respectively connected to the two ends of the secondary side of the second transformer 11.

That is, the driving phases 12 and 14 and the driving phases 13 and 15, spatially shifted from each other by 180°, are connected to the two ends of the secondary side of the first transfer 10 and the two ends of the secondary side of the second transformer 11, respectively.

Alternating signals output from the two ends of the secondary side of each transformer have 180°-inverted waveforms. The use of a center-tapped transformer can reduce the difference between the waveforms at the two ends of the secondary side.

The primary sides of the transformers 10 and 11 are respectively connected to the full bridges of the first and second switching circuits constituted by MOSFETs. The first switching circuit constituted by the MOSFETs 2 to 5 and the second switching circuit constituted by the MOSFETs 6 to 9 are driven by a 90° phase shifter with a phase difference of 90°.

In this case, the MOSFETs are used as switching elements. However, a similar arrangement can be formed by using other semiconductor elements such as bipolar transistors or controllable mechanical contacts.

Figure 2:
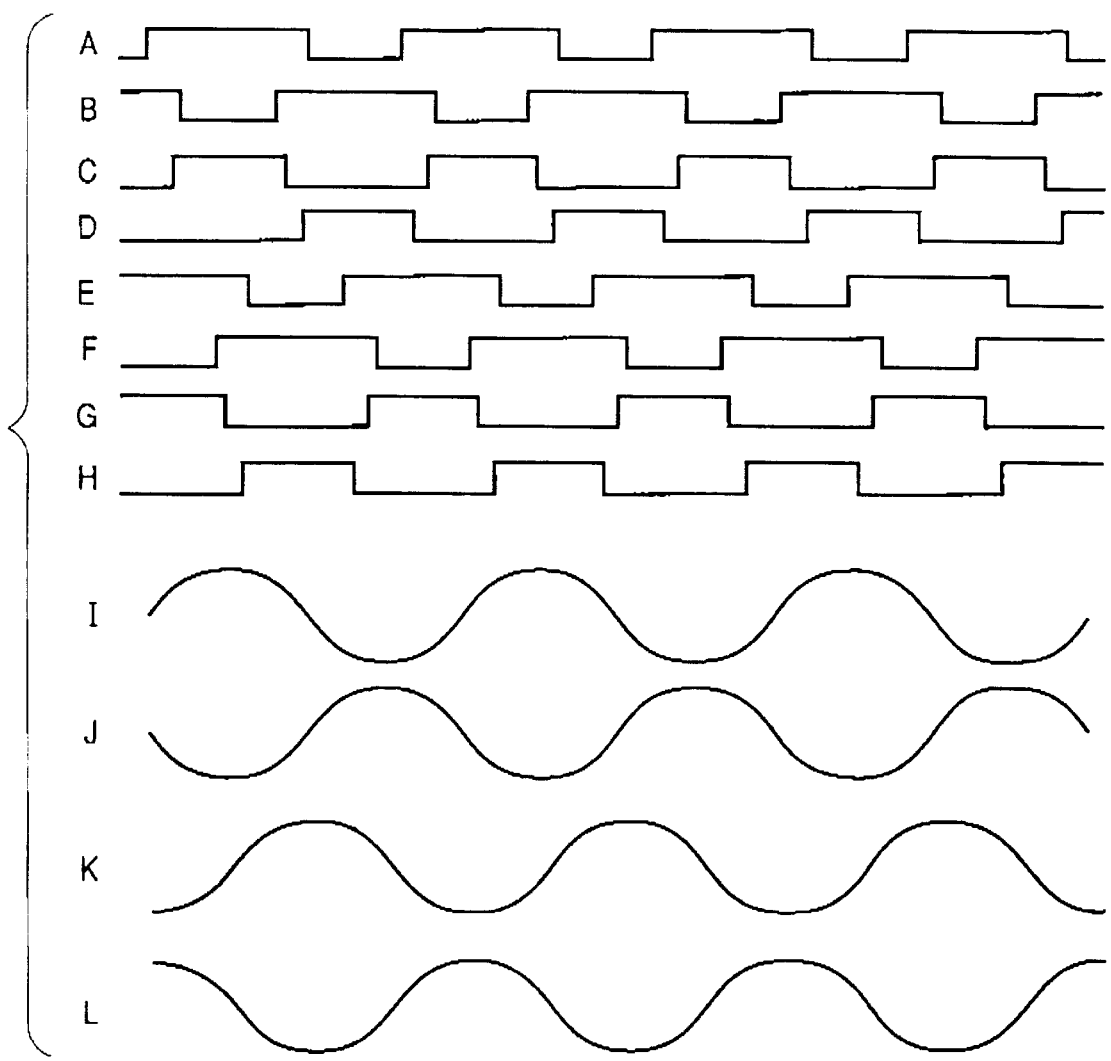
FIG. 2 is a waveform chart showing the operation of the circuit in FIG. 1.

FIG. 2 shows the operation of the first embodiment. A pulse generating circuit (not shown) generates driving pulses A to H. The FETs 2, 3, 6, and 7 are P-channel transistors, and hence are turned on at a low logic level. The FETs 4, 5, 8, and 9 are N-channel transistors, and hence are turned on at a high logic level. The pulses A to D and the pulses E to H are adjusted to have a phase difference of 90° from each other.

When the MOSFETs 2 and 5 are turned on by the pulses A and D, a current flows downward on the primary side of the first transformer 10 in FIG. 1. When the FETs 3 and 4 are turned on by the pulses C and B, a current flows upward on the primary side of the first transformer 10. By repeating this operation at the driving frequency of the vibration member, a driving signal is generated on the secondary side of the first transformer 10.

At this time, since the inductance of the first transformer 10 is impedance-matched with the capacitance of the piezoelectric element, boosted sine waveform voltages are generated at the two ends of the secondary side of the first transformer 10.

In this case, since a center tap is set at the middle point of the inductance on the secondary side of the first transformer 10 and is grounded, voltages having the waveforms shown in I and J of FIG. 2 which are symmetrical about ground are generated at the two ends of the secondary side of the transformer.

Likewise, by applying the pulses E to H to the circuit comprised of the second switching circuit constituted by the MOSFETs 6 to 9 and the second transformer 11, boosted two-phase voltages K and L symmetrical about ground can be generated at the two ends of the secondary side of the second transformer 11.

At this time, since the pulses A to D and the pulses E to H are adjusted to have a phase difference of 90° from each other, 0° and 180° driving signals, for example, can be generated from the secondary side of the first transformer 10, and 90° and 270° driving signals can be generated from the secondary side of the second transformer 11.

The first transformer 10 is connected to (A+) and (A−) electrodes 12 and 14, and the two ends of the second transformer 11 are connected to the (B+) and (B−) electrodes 13 and 15 to excite a traveling wave like that described above in the vibration member. At this time, the moving member pressed against the vibration member is driven in a direction opposite to the direction of the traveling wave.

Figure 17:
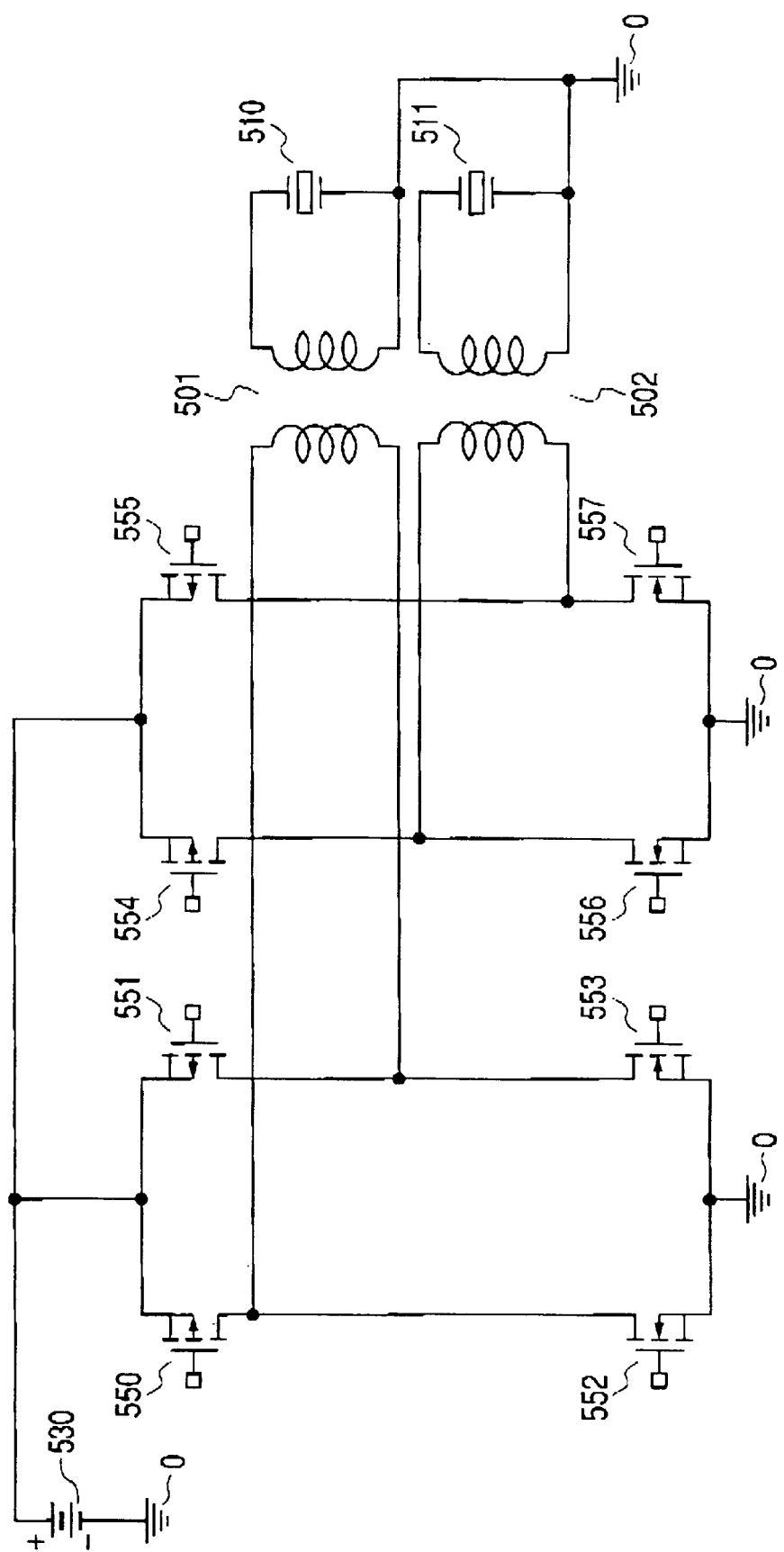
FIG. 17 is a circuit diagram showing a driving circuit of a conventional two-phase driving vibration type actuator.
Figure 18:
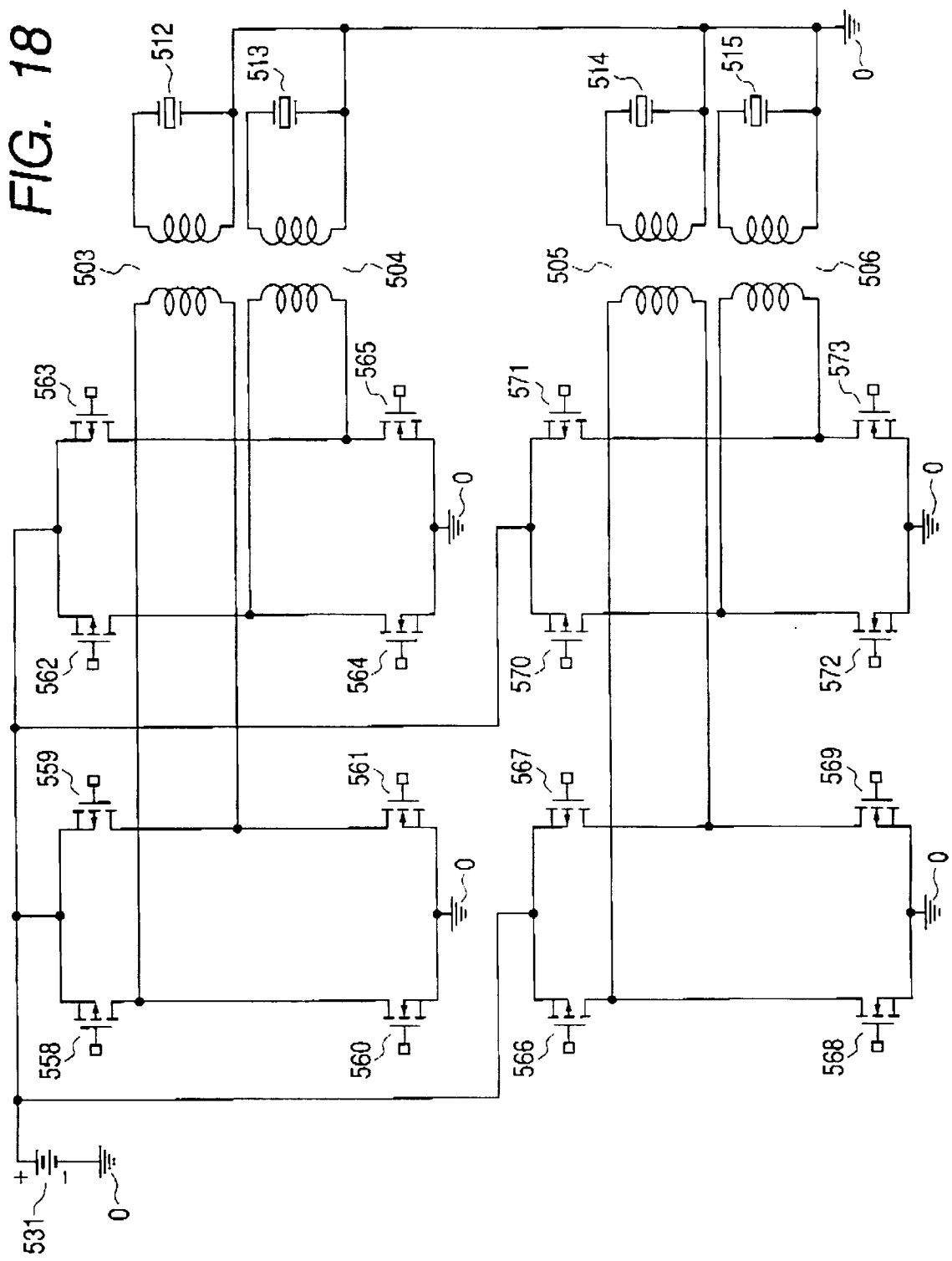
FIG. 18 is a circuit diagram showing a case wherein the circuit in FIG. 17 is applied to a four-phase driving vibration type actuator.

When the moving member is to be driven in a direction opposite that in the case shown in FIG. 2, pulses A to D and pulses E to H may be adjusted so as to have a phase difference of −90° from each other. This arrangement can reduce the number of FETs by eight and the number of transformers by two as compared with the conventional circuit shown in FIG. 17, thus attaining a reduction in cost and space saving.

Figure 3A:
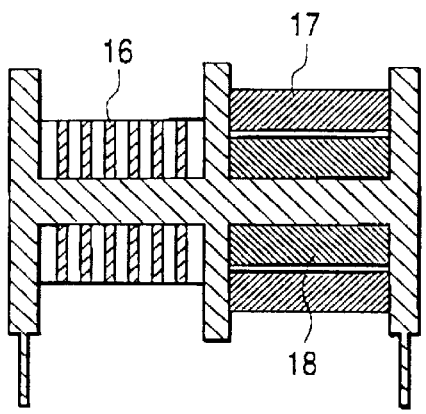
FIG. 3A is view showing an example of the structure of a preferred transformer.

FIG. 3A is a sectional view showing an example of the transformer in this embodiment. This transformer has a primary coil 16 and secondary coils 17 and 18. When a high voltage is to be generated, phase separation must be done.

Figure 3B:
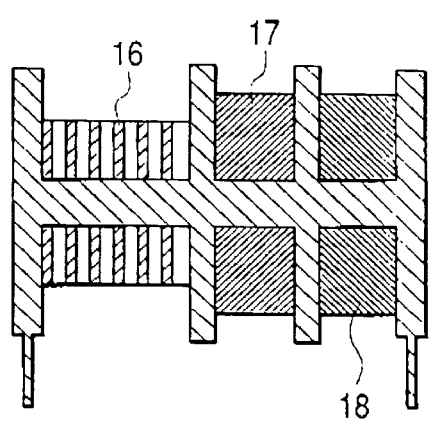
FIG. 3B is a view showing the structure of an inappropriate transformer.

If a separation arrangement like the one shown in FIG. 3B is formed, since the coupling coefficient of the primary coil 16 and the inner secondary coil 17 greatly differs from that of the coils 16 and 18, a voltage imbalance occurs. This may affect the performance of the motor and also may cause abnormal wear.

In the arrangement shown in FIG. 3A, in which the coil 17 is wound around the coil 18 by stacked winding, since the secondary coils 17 and 18 are almost symmetrical about the primary coil 16, such an imbalance is very small. If, however, the inner and outer coils 17 and 18 have the same number of turns, they have different inductance values. For this reason, the inner and outer coils have different numbers of turns in order to match inductance values.

Figure 4:
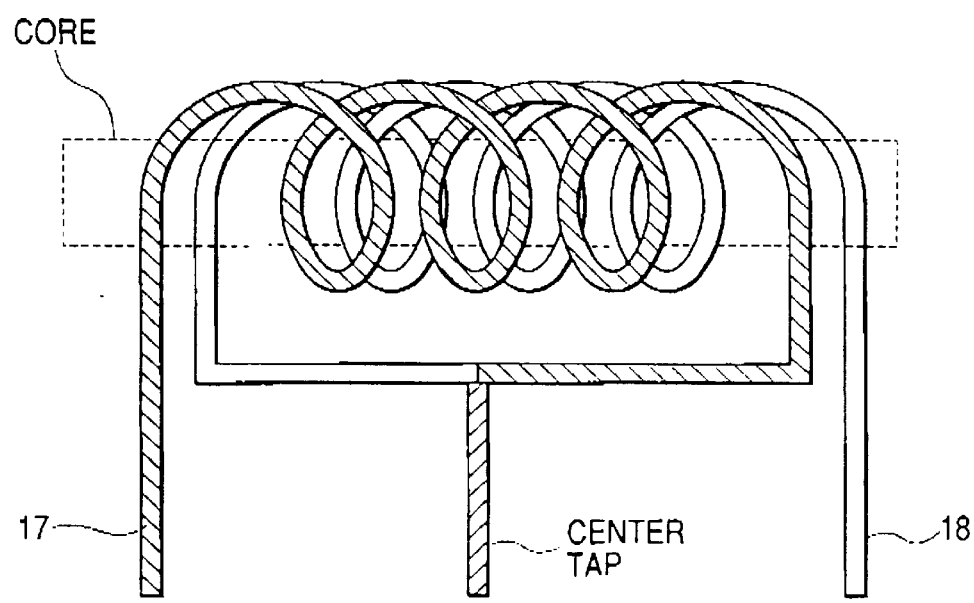
FIG. 4 is a view for explaining an example of bifilar winding of a transformer.

In this case, therefore, each center tap is not set at the middle point of the winding but is set at the middle point of the inductance values. If no problem arises in terms of the breakdown voltage of the windings, the two secondary coils 17 and 18 and a center tap may be formed by bifilar winding, i.e., winding the two coils together around a core, as shown in FIG. 4.

In this case, since excellent symmetry is ensured, a good voltage balance can be obtained between the two phases. This makes it possible to prevent the above problems due to the voltage imbalance.

Figure 5:
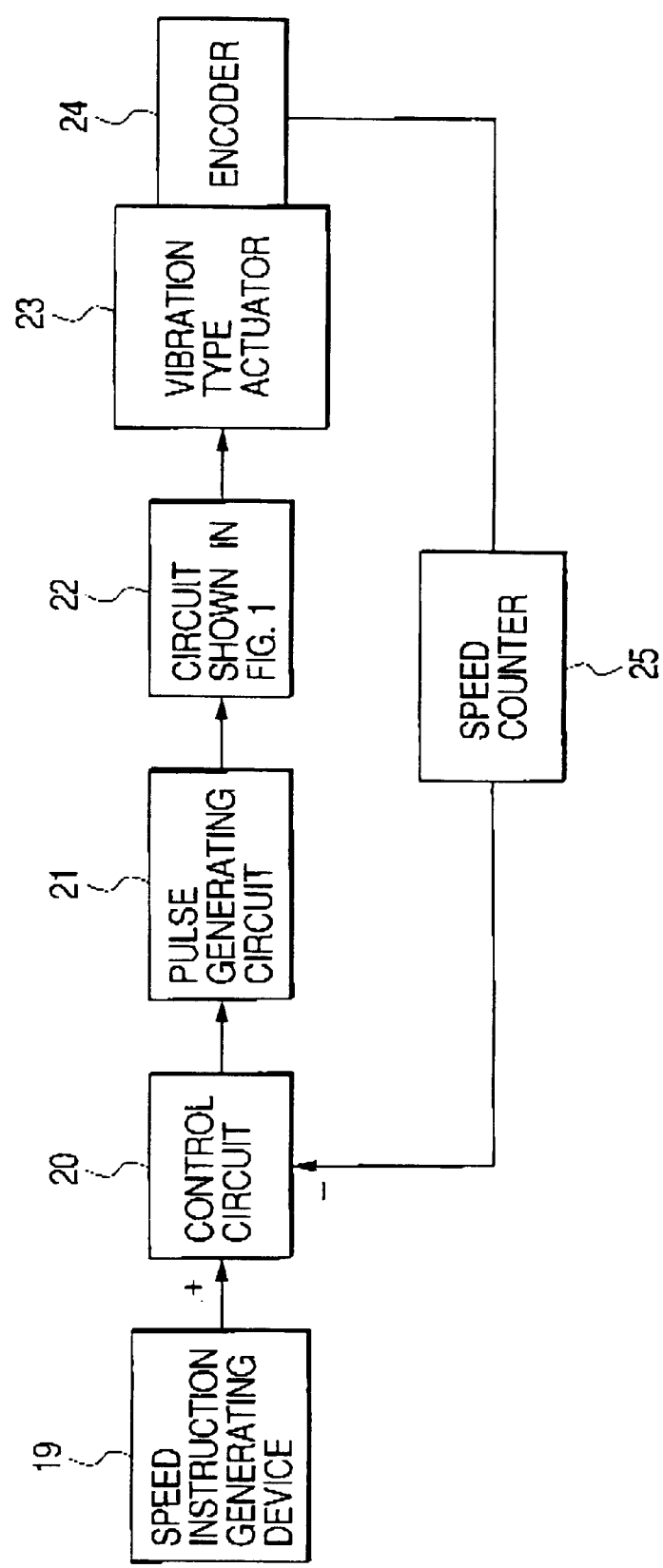
FIG. 5 is a block diagram showing a driving control circuit using the circuit in FIG. 1.

Alternatively, the arrangement shown in FIG. 5 can be formed. In this arrangement, speed information from a speed detecting means for detecting a speed by detecting pulses from a rotary encoder 24 through a speed counter 25 is output to a control circuit 20. The control circuit 20 compares the speed information with a speed instruction from a speed instruction generating device 19 and multiplies the speed information by an appropriate control gain to obtain the value of the speed instruction. The control circuit 20 then provides a pulse generating circuit 21 with feedback on the frequency, pulse width, and the like of a driving pulse, and applies pulses to the circuit shown in FIG. 1, thereby applying AC voltages with phase shifts of 0°, 180°, 90°, and 270° from the first and second transformers to the respective phases of a four-phase driving vibration type actuator 23.

In this case, the speed instruction generating device 19 is a device such as a microcomputer which controls the system and generates a speed instruction in accordance with the purpose of a control target. Although FIG. 5 shows a feedback arrangement for speed, a feedback arrangement for position, torque, output, or the like can also be formed.

Second Embodiment

Figure 6:
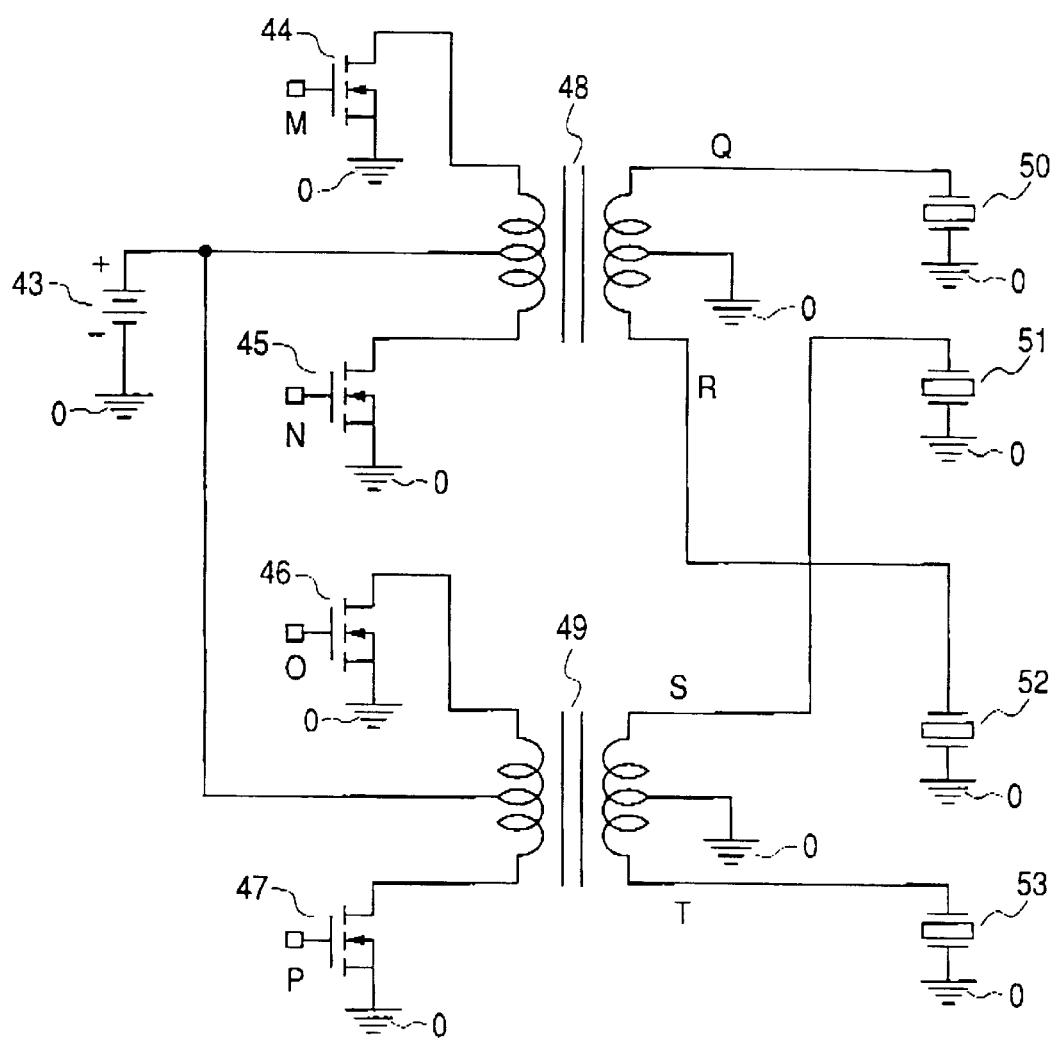
FIG. 6 is a circuit diagram showing the second embodiment of the present invention.
Figure 7:
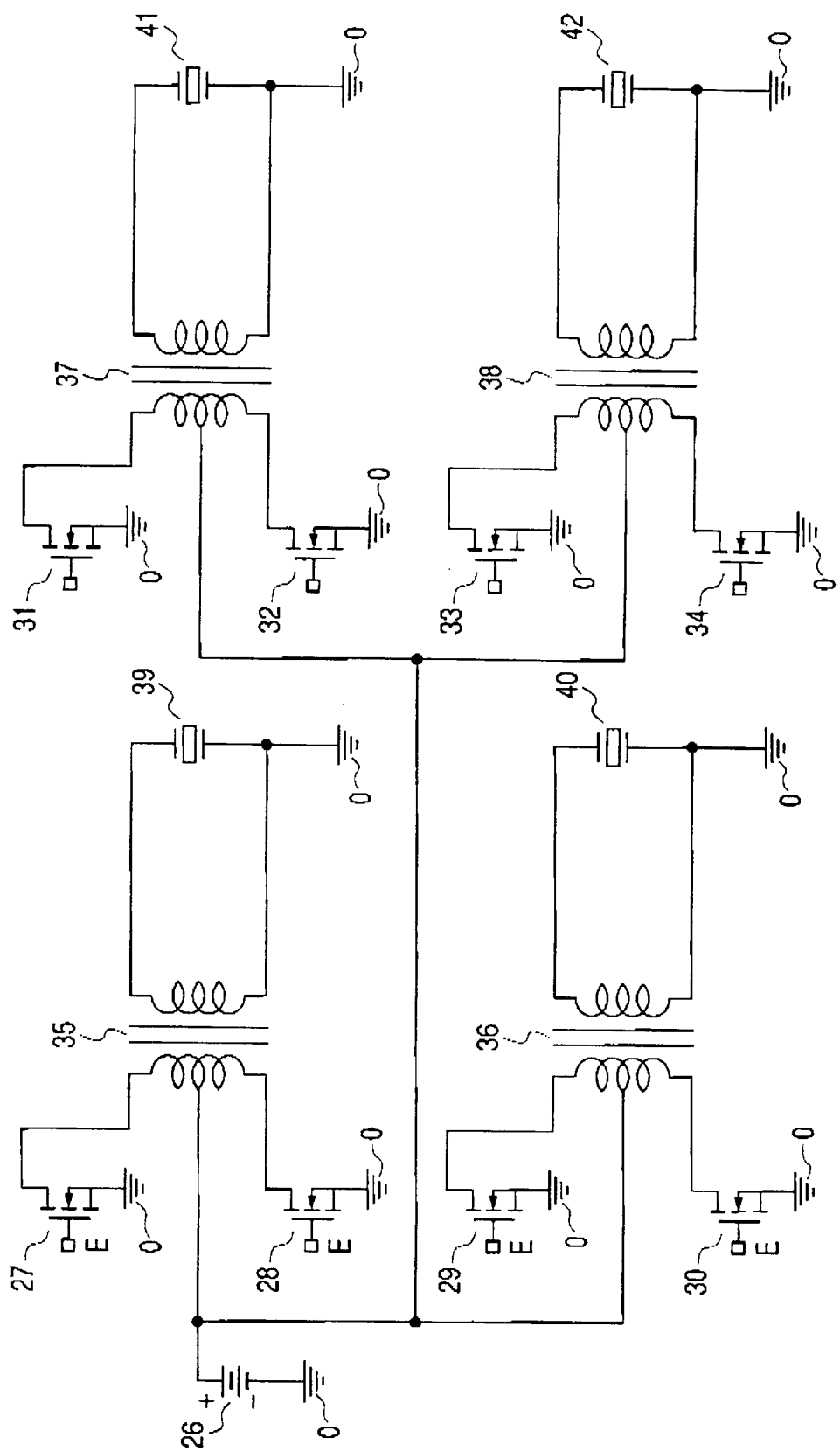
FIG. 7 is a circuit diagram showing a conventional circuit corresponding to the second embodiment of the present invention.

FIG. 6 is a circuit diagram showing the second embodiment of the present invention. FIG. 7 shows a conventional circuit corresponding to the circuit in FIG. 6. These circuits include DC power supplies 26 and 43, N-channel MOSFETs 27 to 34 and 44 to 47, transformers 35 to 38, 48, and 49, and A+, B+, A−, and B−phases 39, 40, 41, and 42 and 50, 51, 52, and 53 of four-phase driving vibration type actuators.

As in FIG. 1, pulse generating circuits are not shown. All the MOSFETs of a circuit of this type are N-channel transistors. For this reason, a simple pre-driver can be used and the number of switching elements is small as compared with the bridge type switching circuit shown in FIG. 1.

Each of the first and second transformers 48 and 49 in the embodiment shown in FIG. 6 has center taps on the primary and secondary sides. The primary and secondary sides of each center tap are respectively connected to a DC power supply and ground. Note that this center tap is a middle point of the inductance, but need not always be a middle point of the winding.

Figure 8:
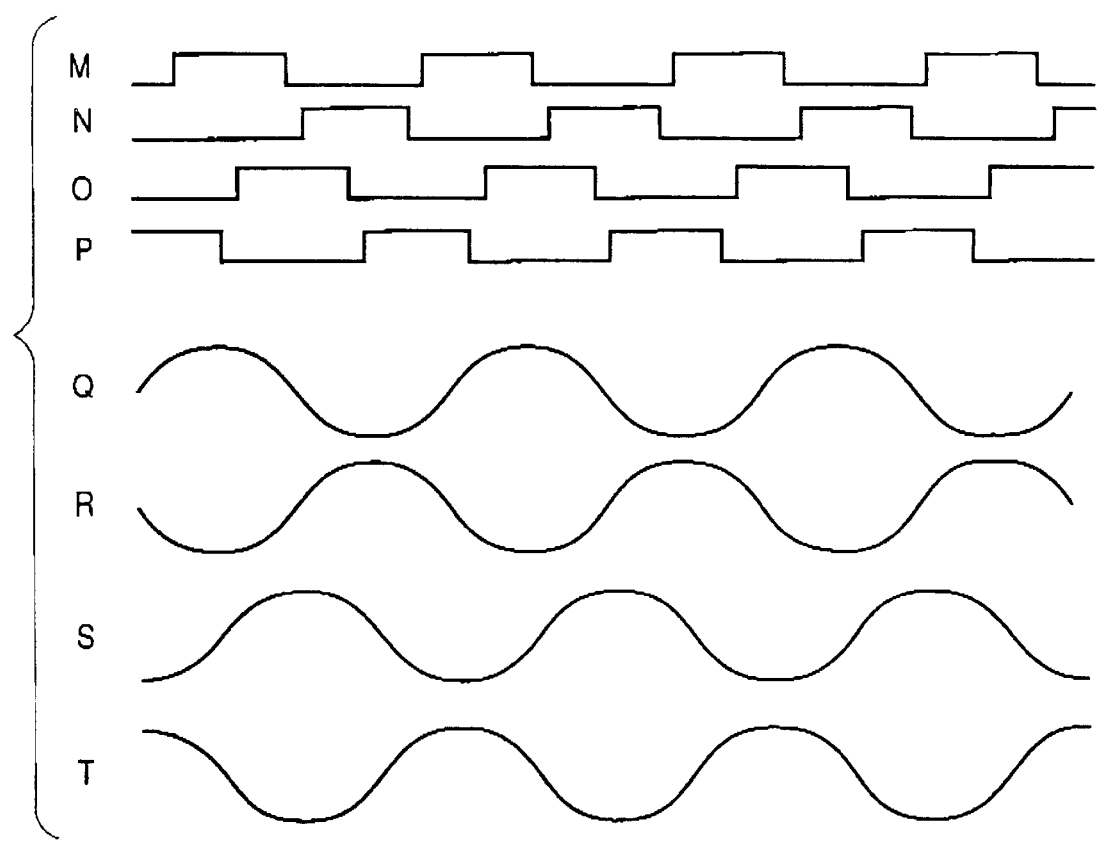
FIG. 8 is a waveform chart showing the operation of the circuit in FIG. 6.

The two ends of the secondary side of the first transformer 48 are respectively connected to the A+and A−phases of the vibration type actuator. The two ends of the secondary side of the second transformer 49 are respectively connected to the B+and B−phases of the vibration type actuator. FIG. 8 is a view showing the operation of the circuit in FIG. 6.

On the primary sides of the first and second transformers 48 and 49, the MOSFETs 44 to 47 are push-pull driven by pulses M to P to make currents flow in the upper and lower coils.

As a consequence, boosted AC voltages are generated at the two ends of the secondary side of each of the first and second transformers 48 and 49. At this time, since the center tap on the secondary side is grounded, AC voltages symmetrical about ground, i.e., voltages having a phase difference of 180°, are generated at the two ends of the secondary side.

In this embodiment, since the pulses M and N and the pulses O and P have a phase difference of 90°, the voltages generated at both ends of first and second transformers 48 and 49 have a phase differences of 90°. As a consequence, four-phase driving voltages (Q, R, S, T) of 0°, 90°, 180°, and 270° with respect to ground can be generated.

In this embodiment, center taps are formed in the same manner as in the first embodiment, and hence the transformers are preferably formed by stacked winding or bifilar winding. In addition, an arrangement for feeding back a speed or position signal as shown in FIG. 5 can also be formed. Although a detailed description of the conventional circuit in FIG. 7 will be omitted, four-phase voltages are generated by using four transformers and four switching circuits. As compared with this circuit, the circuit in FIG. 6 can reduce the number of FETs and transformers by half.

Third Embodiment

Figure 9:
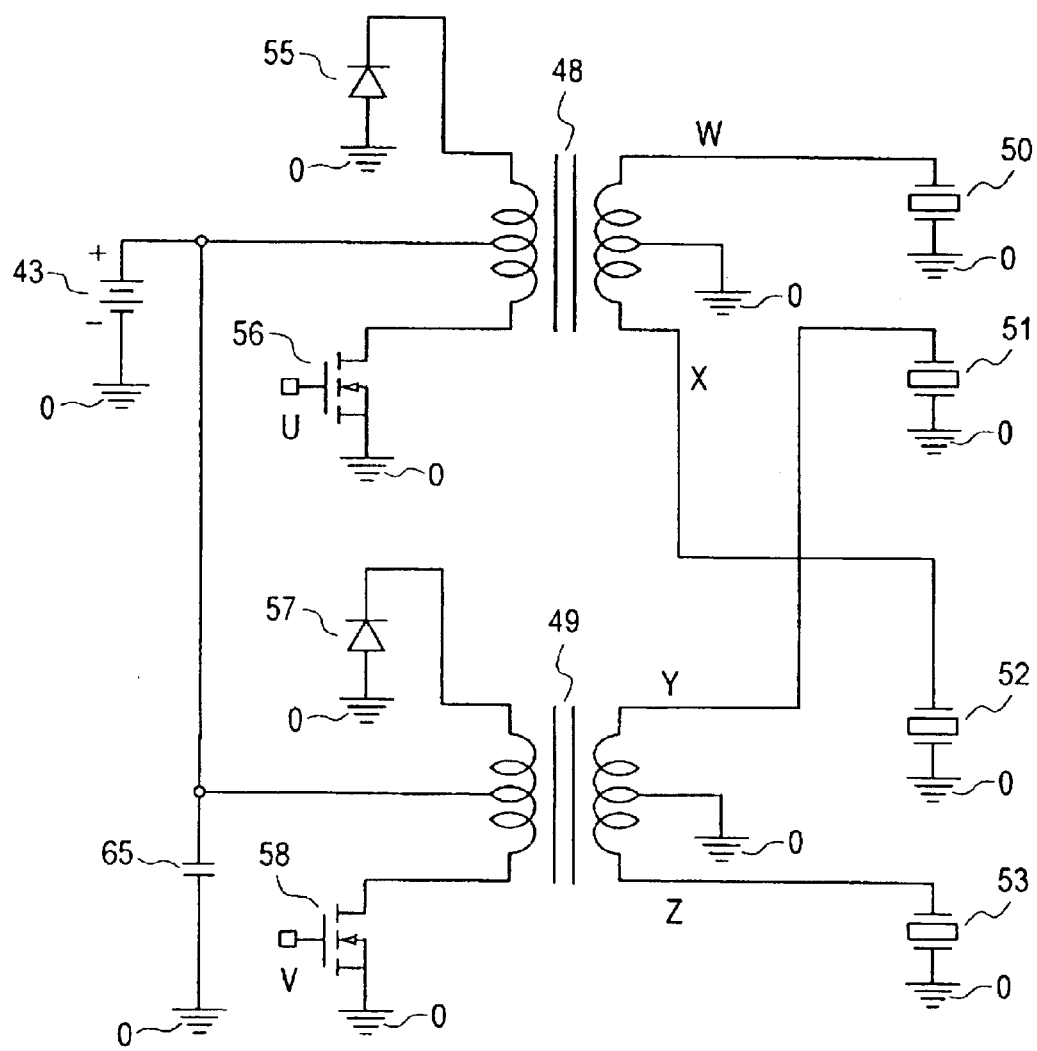
FIG. 9 is a circuit diagram showing the third embodiment of the present invention.

FIG. 9 is a circuit diagram showing the third embodiment of the present invention. This circuit is obtained by replacing the two MOSFETs 44 and 46 of the circuit in FIG. 6 with diodes 55 and 57, and has the same arrangement as that of the circuit in FIG. 6 except for this.

Figure 10:
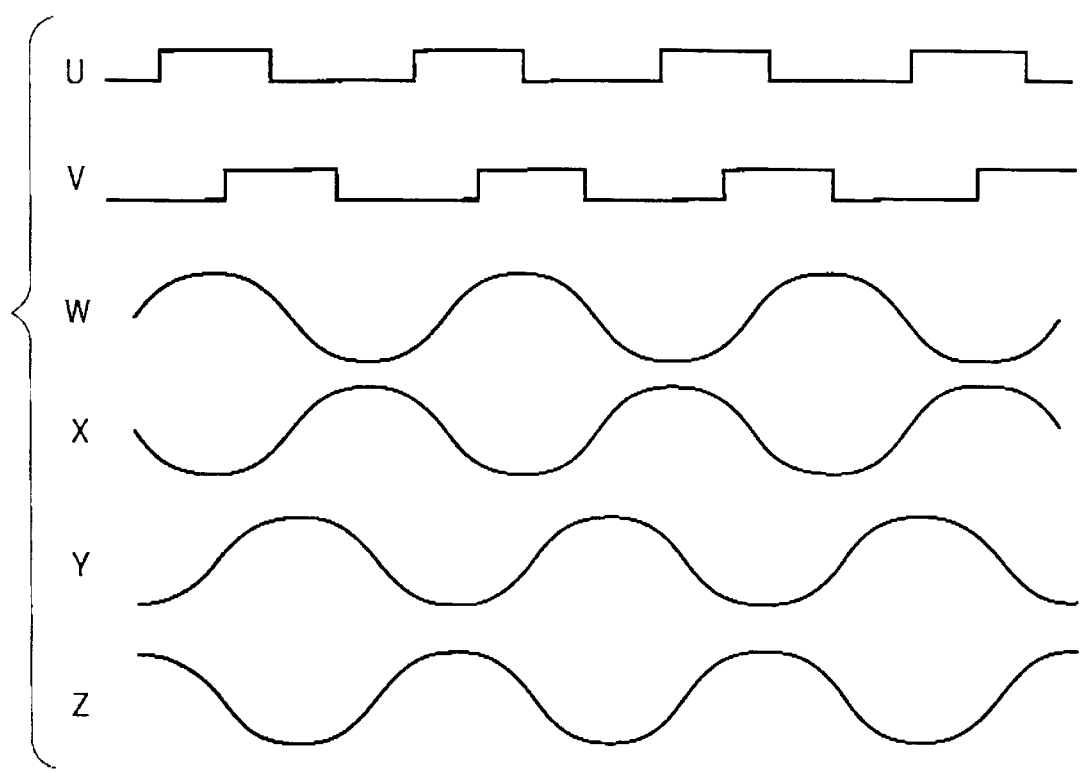
FIG. 10 is a waveform chart showing the operation of the circuit in FIG. 9.

FIG. 10 shows operating waveforms (W, X, Y, and Z). N-channel MOSFETs 56 and 58 are turned on and off by pulses U and V having a phase difference of 90°. When the MOSFET is turned off, an induced voltage is generated at the drain of the FET by the inductance component of the transformer. The diode and the winding on the diode side of the transformer serve to reset this voltage. The winding on the diode side is wound by bifilar winding to have a high coupling coefficient with the winding on the FET side.

When the FET is turned off to generate an induced electromotive force, an electromotive force having an opposite polarity is generated at the cathode of the diode symmetrical with the FET. The diode is then turned on to regenerate energy in a power supply capacitor 65 through the primary winding of the transformer. As a result, the induced voltage applied to the FET is suppressed.

Since the center tap is grounded, the voltages generated on the secondary side are two-phase AC voltages having a phase difference of 180°. This allows one transformer to drive two phases. This circuit can further reduce the number of switching elements used in the circuit according to the second embodiment by half, thus attaining a reduction in cost and space saving.

Fourth Embodiment

Figure 11:
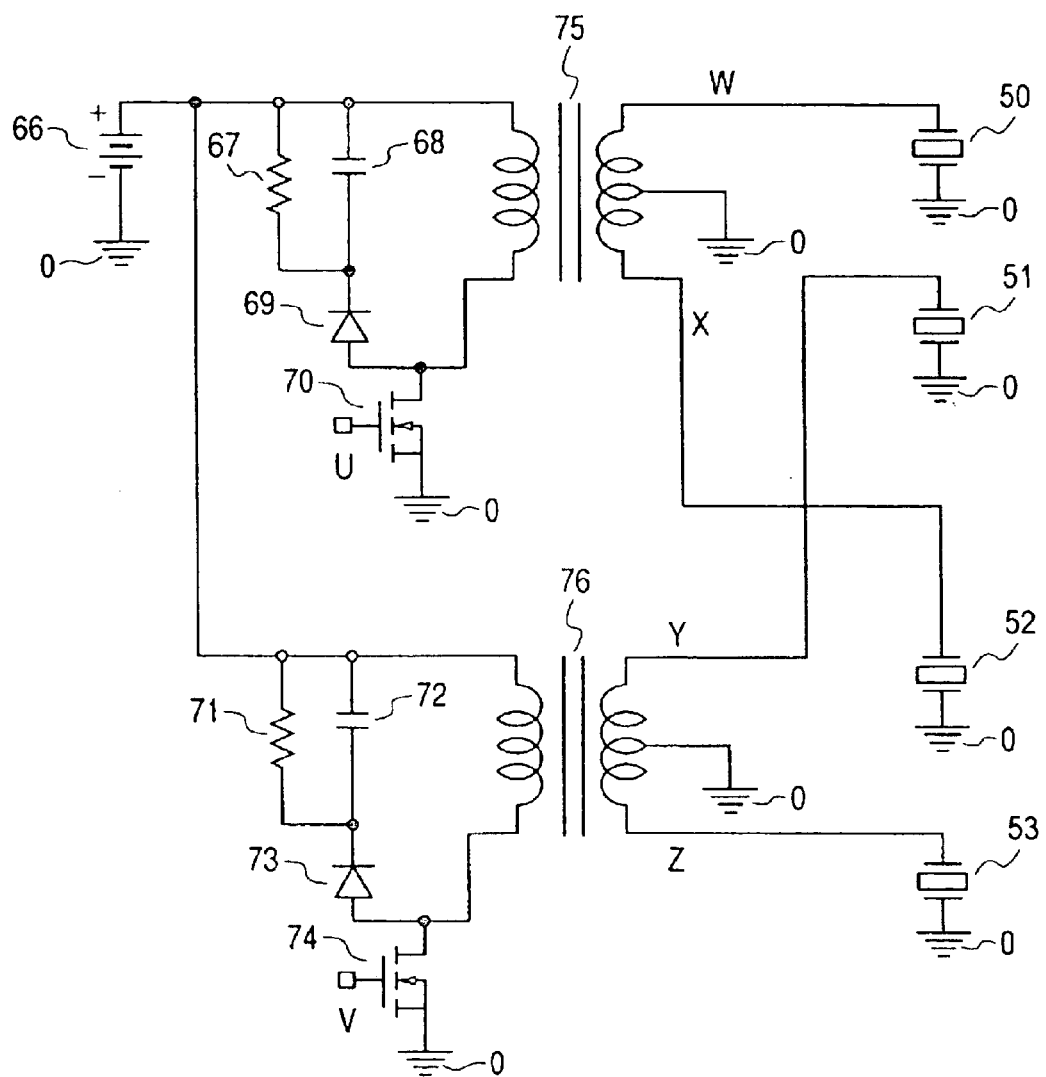
FIG. 11 is a circuit diagram showing the fourth embodiment of the present invention.
Figure 12:
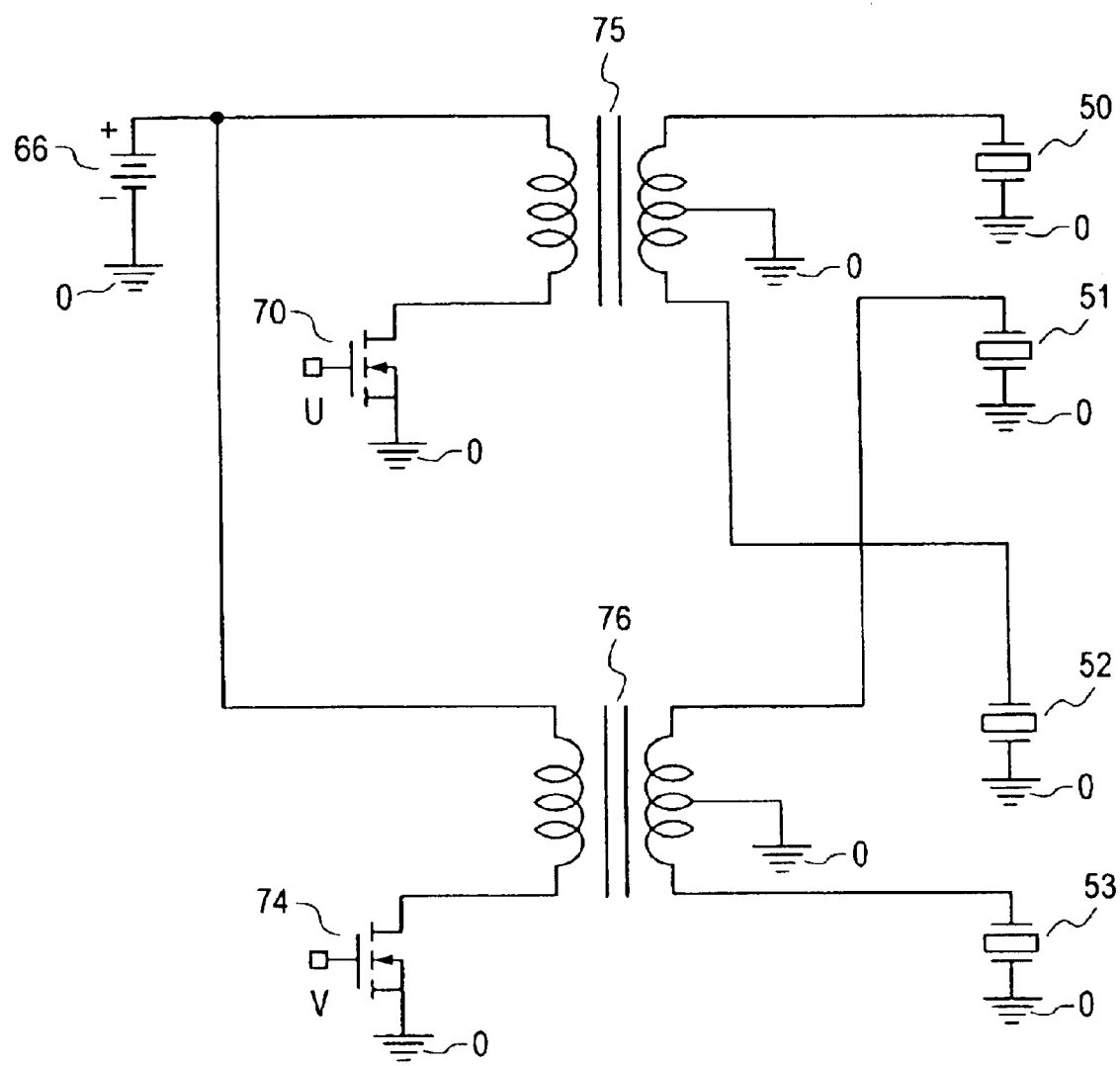
FIG. 12 is a circuit diagram showing a modification of the fourth embodiment of the present invention.

FIG. 11 is a circuit diagram showing the fourth embodiment of the present invention. FIG. 12 is a circuit diagram showing a circuit obtained by simplifying the fourth embodiment shown in FIG. 11. The circuit in FIG. 12 causes a slight waveform deformation and deteriorates in efficiency, but attains a reduction in cost and space saving as compared with the first to third embodiments.

Each transformer 75 and 76 has a single-layer winding on the primary side and the same secondary side arrangement as that of the first to third embodiments. The primary side of the transformer is connected to a DC power supply 66, and the other side to a switching element (MOSFET).

Operating waveforms are identical to those in FIG. 10.

Boosted 0°, 180°, 90°, and 270° driving voltages (W, X, Y, Z) are sequentially generated on the secondary sides of the transformers driven by two-phase pulses U and V with a phase difference of 90° in the order named in the circuits shown in FIGS. 11 and 12. The circuit in FIG. 11 constituted by a resistor 67, capacitor 68, diode 69, resistor 71, capacitor 72, and diode 73 is a circuit called a snubber circuit. When each MOSFET 70 and 74 is turned off, an induced voltage is generated at the drain due to an induced electromotive force. However, this circuit absorbs induced energy and the resistors consume it to prevent the generation of a high voltage. If each FET has a sufficient breakdown voltage, this snubber circuit may be omitted to form a simpler circuit as shown in FIG. 12.

Fifth Embodiment

Figure 19:
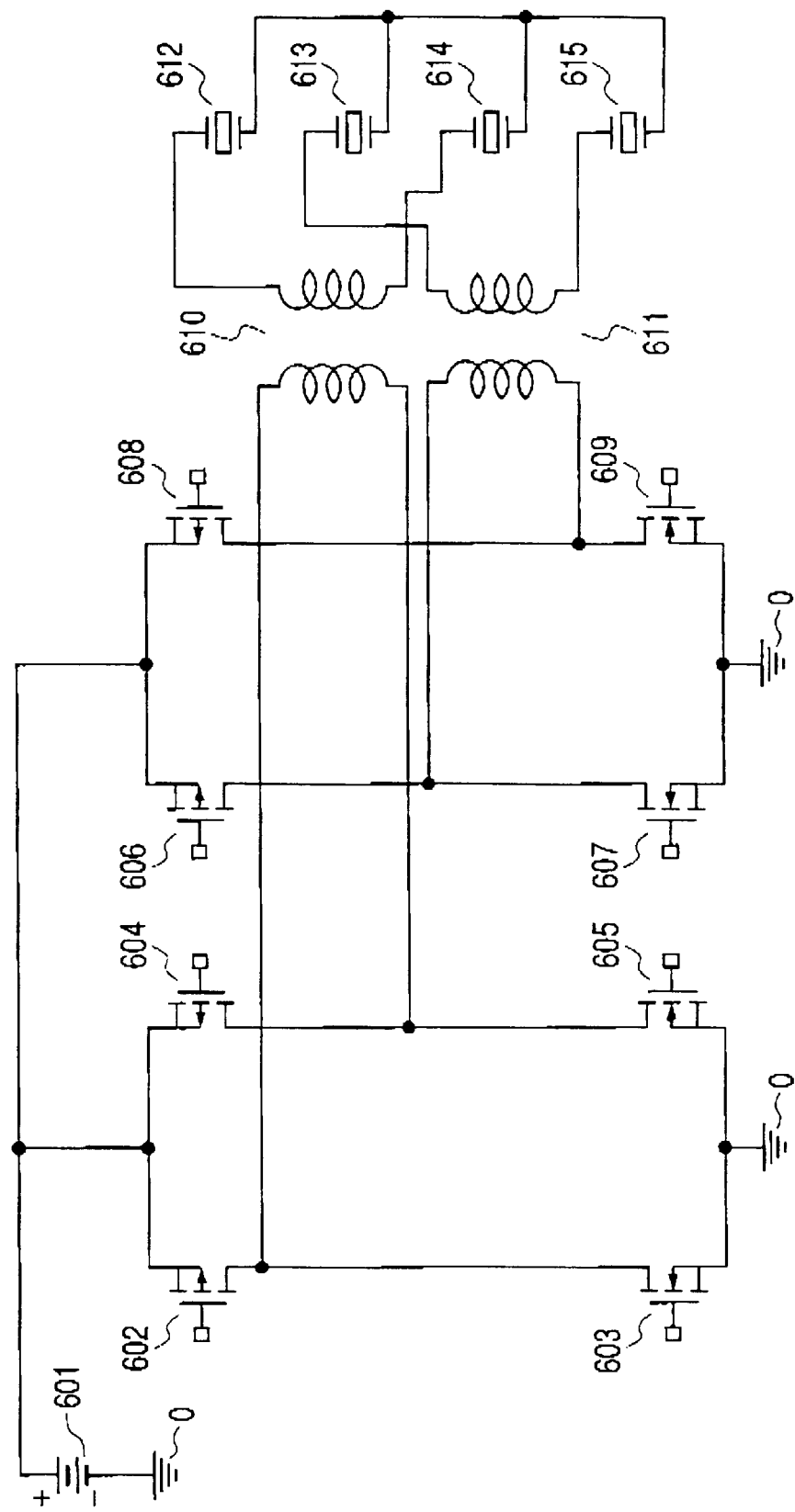
FIG. 19 is a circuit diagram showing the fifth embodiment of the present invention.

FIG. 19 is a circuit diagram showing the fifth embodiment of the present invention. Driving pulses for switching elements 602 to 609 formed by MOSFETs are identical to those used in the circuit shown in FIG. 1. Transformers 610 and 611 having no center taps on either of the primary and secondary sides are used. Driving electrodes (phases) 612, 613, 614, and 615 on one side of an actuator, which spatially have a phase difference of 180°, are connected to the two ends of the secondary side of each of the transformers 610 and 611.

The other electrode of each of the respective phases 612, 613, 614, and 615 is commonly connected. Driving waveforms for this circuit are identical to those for the circuit in FIG. 2. Note that in this circuit, a voltage applied to the actuator is not based on ground but is the voltage between electrodes. In addition, the driving operation can be performed by keeping the common electrode of the actuator at ground potential or any appropriate potential. An advantage of this circuit is that the number of signal lines required for driving can be reduced by one. In addition, since transformers and taps can be omitted, reductions in size and cost can be achieved. Note that the switching circuit and the arrangement on the primary side of each transformer can take the forms shown in FIGS. 6, 7, 9, 11, and 12.

Sixth Embodiment

Figure 20:
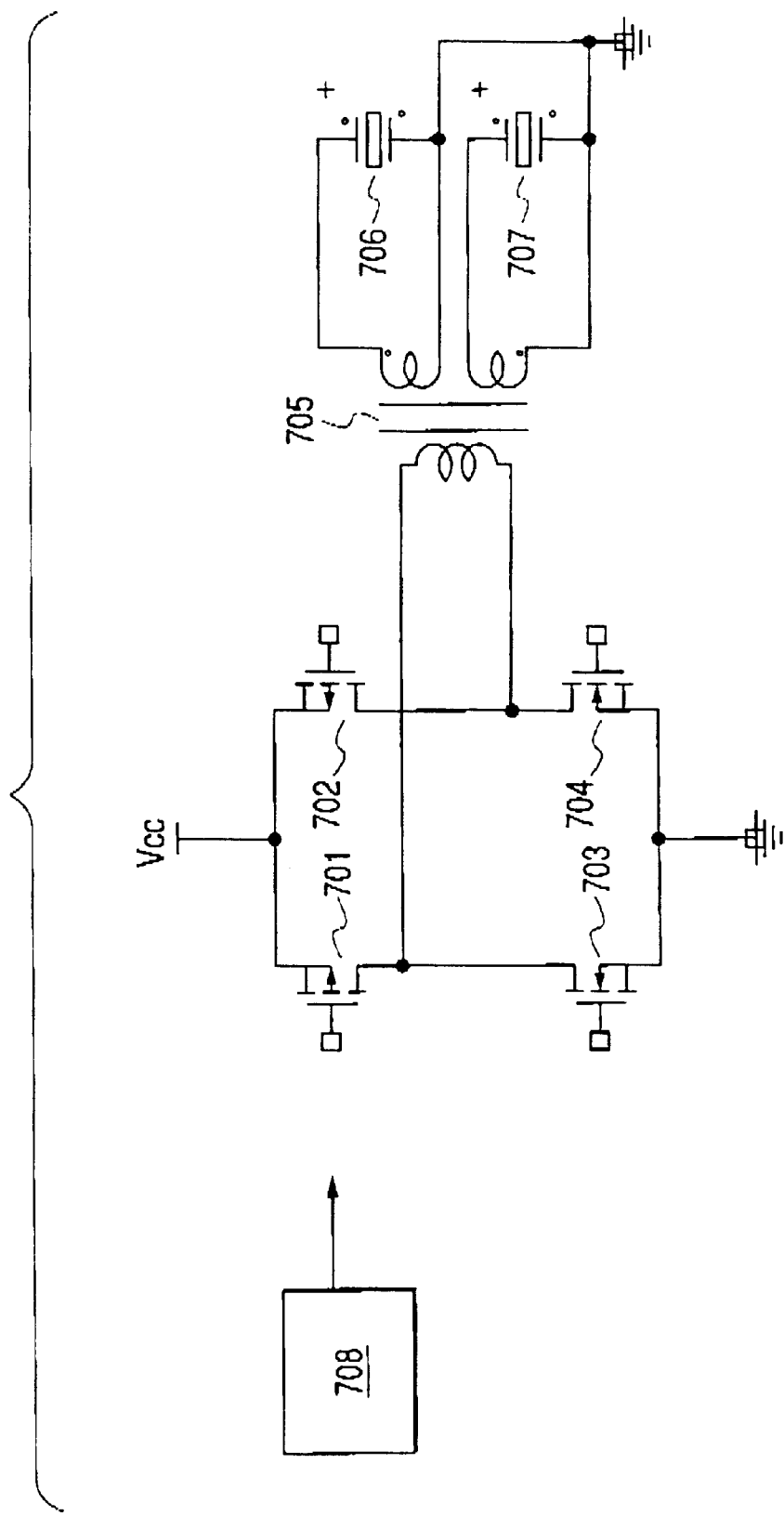
FIG. 20 is a circuit diagram showing the sixth embodiment of the present invention.

FIG. 20 is a circuit diagram showing a circuit to which the sixth embodiment of the present invention can be applied.

Referring to FIG. 20, this circuit includes switching elements 701 to 704 constituted by MOSFETs or the like, a transformer 705 having two inductors (e.g., coils) on the secondary side, driving phases 706 and 707 of piezoelectric elements serving as piezoelectric vibration elements spatially arranged at intervals of ½ the wavelength (λ) of the resonance vibration, and a pulse generating circuit 708 for driving the switching elements.

The dots attached to inductor terminals on the secondary side of the transformer 705 indicate the polarity with respect to the primary side. The sign "+" attached to each piezoelectric element indicates that the piezoelectric element expands when a positive voltage is applied to the positive terminal.

Figure 21:
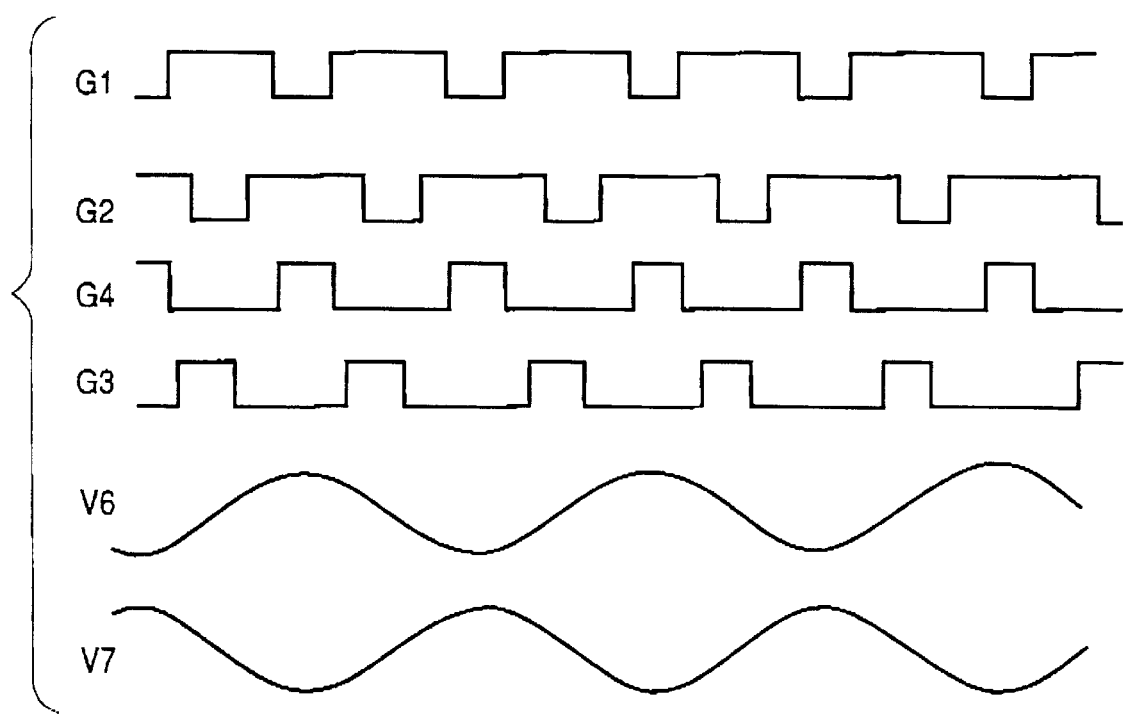
FIG. 21 is a waveform chart showing the operation of the circuit in FIG. 20.

FIG. 21 shows operating waveforms in this circuit. The pulse generating circuit 708 applies gate voltages G1 to G4 to the switching elements 701 to 704. Voltages V6 and V7 are generated at the positive electrodes of the piezoelectric elements 706 and 707.

The MOSFETs 701 and 702 are P-channel transistors, and hence are turned on at a low logic level. The MOSFETs 703 and 704 are N-channel transistors, and hence are turned on at a high logic level.

When the FETs 701 and 704 are turned on by the pulses G1 and G4, a current flows downward on the primary side of the transformer 705 in FIG. 20. When the FETs 702 and 703 are turned on by the pulses G2 and G3, a current flows upward on the primary side of the transformer 705. By repeating this operation at the driving frequency of the vibration member, a driving signal is generated on the secondary side of the transformer.

At this time, since the inductors connected to the positive sides of the piezoelectric elements have opposite polarities, driving signals 180° out of phase (opposite phases) are generated in the two driving phases. As a consequence, a standing wave is excited in the vibration member.

Figure 22:
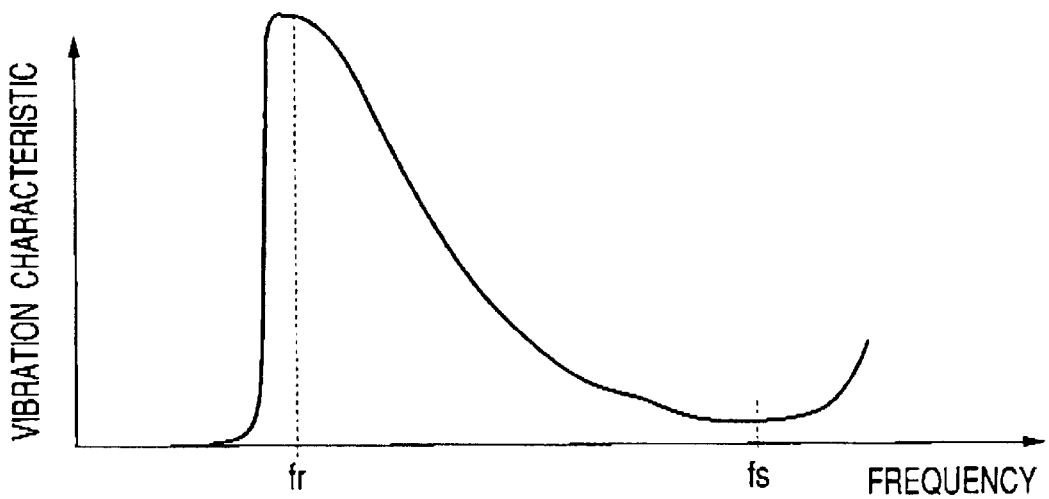
FIG. 22 is a graph showing the frequency-vibration characteristic of a vibration member.

Note that a piezoelectric element has a relatively large capacitance, and hence a large inrush current flows in this element without any change, resulting in a deterioration in efficiency. In addition, the switching circuit generates a distorted output waveform without proper matching. Furthermore, as shown in FIG. 22, such a vibration member exhibits a special hysteresis phenomenon, and hence is used in a frequency band higher than a general resonance frequency fr.

In addition, in many cases, a vibration member has a plurality of driving modes. The above case indicates that a vibration of an order higher than that of the driving mode appears at a frequency higher than a frequency (fs) at which the vibration amplitude of the vibration member increases for the first time in a frequency region higher than the resonance frequency (fr) of the vibration member.

As a matching method for such a circuit, the technique disclosed in Japanese Patent Application Laid-Open No. 2-179282 is known. However, the same idea cannot be applied to the circuit of this embodiment because of the transinductance between the two inductors on the secondary side.

Letting L1 and L2 be the respective inductances, and M be the transinductance, a synthetic inductance Lsyn of the two inductors on the secondary side can be given by $$Lsyn = L1 + L2 + 2M$$

Since the capacitances of the two driving phases can be regarded as almost equal, the inductances are preferably set to be equal to each other. Therefore, $$L = L1 = L2$$

In addition, since the secondary inductors of a transformer generate a common magnetic flux unless a large leakage flux is set between the secondary inductors of the transformer, $$L = L1 = L2 = M$$

Therefore, $$Lsyn = 4L$$

On the other hand, letting Cd be the capacitance of one phase, a synthetic capacitance Csyn driven by one transformer is given by $$Csyn = Cd/2$$

The inductance Lsyn and capacitance Csyn can cause parallel resonance, and its frequency fre' is given by $$fre' = 1/\{2\pi\sqrt{(Lsyn \cdot Csyn)}\}$$
$$= 1/\{2\pi\sqrt{(4L \cdot Cd/2)}\}$$
$$= 1/\{2\pi\sqrt{(2L \cdot Cd)}\}$$

A resonance frequency fre of the driving phase and inductor is given by $$fre = 1/\{2\pi\sqrt{(L \cdot Cd)}\}$$

Therefore, $$fre' = fre/\sqrt{2}$$

In a conventional driving circuit, when the driving frequency (fd) and resonance frequency (fre) coincide with each other, matching is attained to realize the higest efficiency, and a waveform distortion is small.

According to the circuit scheme of this embodiment, however, when the frequencies fd and fre' coincide with each other owing to the influence of transinductance, the highest efficiency is attained, and a waveform distortion is reduced.

In addition, as shown in FIG. 22, if there are a plurality of modes, the frequency fd that can be used for driving is expressed as $$fr < fd < fs$$

Since the highest efficiency can be obtained when fd=fre', proper matching can be attained in the circuit of this embodiment by satisfying $$fr < fre/\sqrt{2} < fs \qquad (1)$$

In this embodiment, efficient driving can be realized in a wide frequency region defined by $$fr < fd < fs$$

Therefore, the embodiment is suitable for frequency-based vibration control.

This embodiment has exemplified the circuit constituted by only the transformers and vibration member. However, a circuit using external adjustment capacitors is also incorporated in the present invention as long as it satisfies inequality (1).

Figure 25:
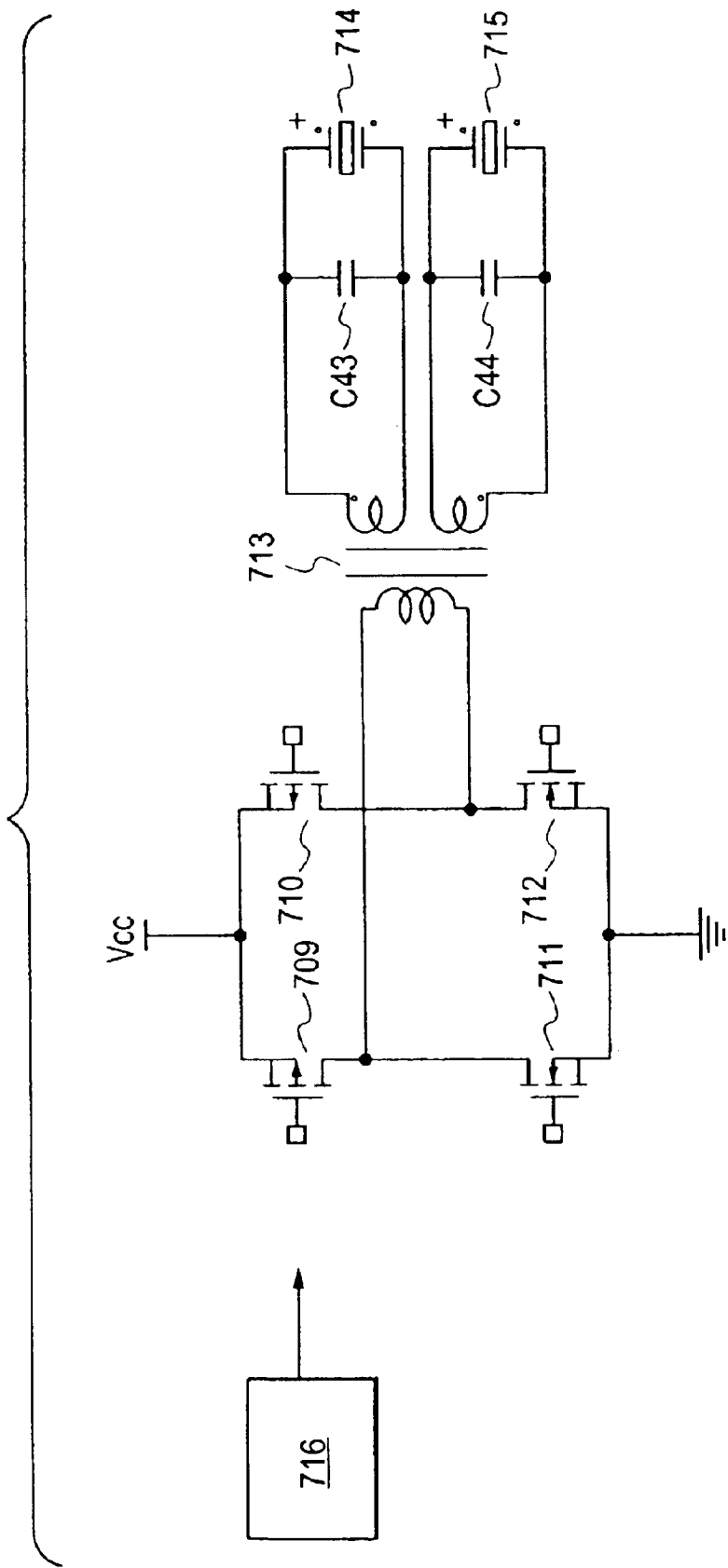
FIG. 25 is a circuit diagram showing a modification of the sixth embodiment of the present invention.

More specifically, as shown in FIG. 25, capacitors C43 and C44 may be attached as auxiliary elements to the secondary side of a transformer to intentionally shift the frequency fre to a value that can be easily adjusted.

This embodiment has also exemplified the arrangement having the common electrode of the respective phases as an arrangement for parallel resonance. Even if, however, the two phases are set in a floating state, similar driving can be done.

As a switching circuit, a full bridge circuit has been described. However, the same circuit settings as those of the embodiment of the present invention can be applied to any circuit as long as it can turn on/off a current flowing on the primary side of a transformer at a predetermined frequency.

Figure 26:
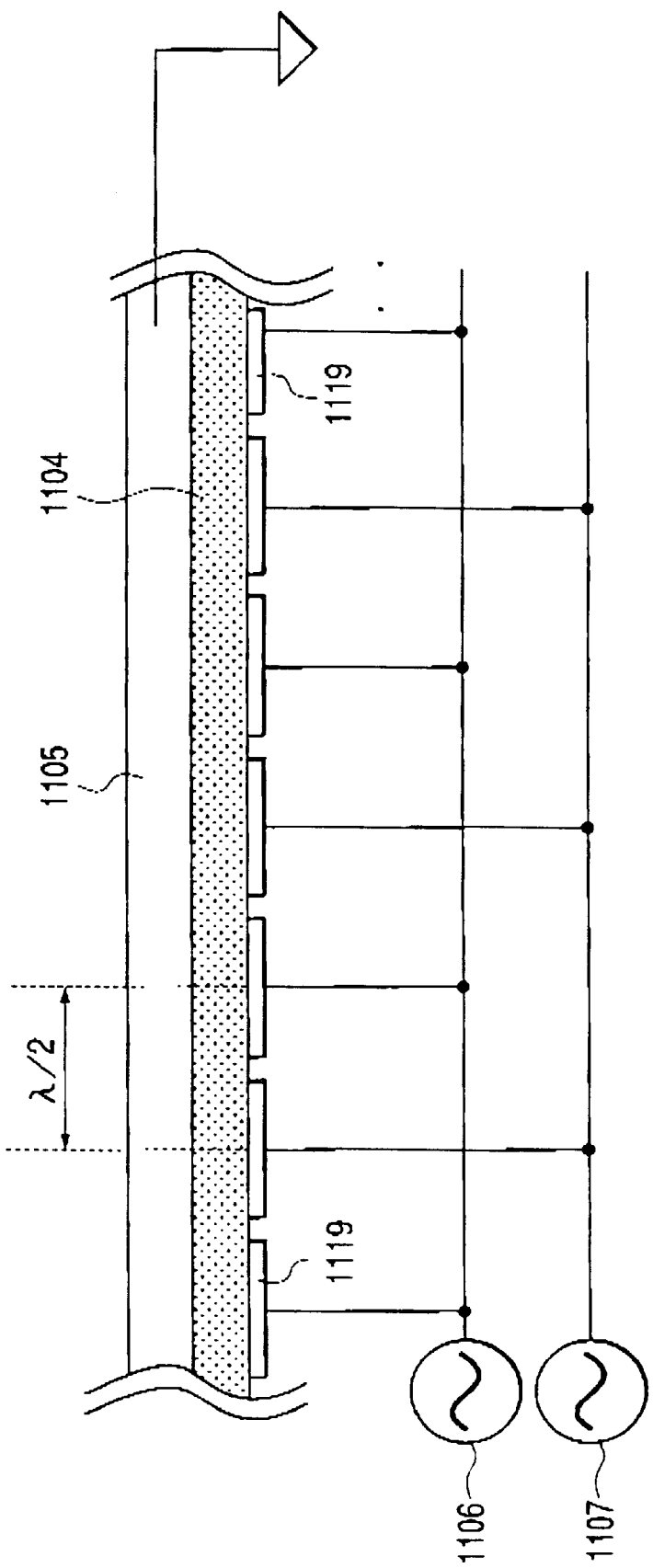
FIG. 26 is a view showing a piezoelectric element for a vibration member to which the present invention is applied and an arrangement for applying driving voltages.
Figure 27:
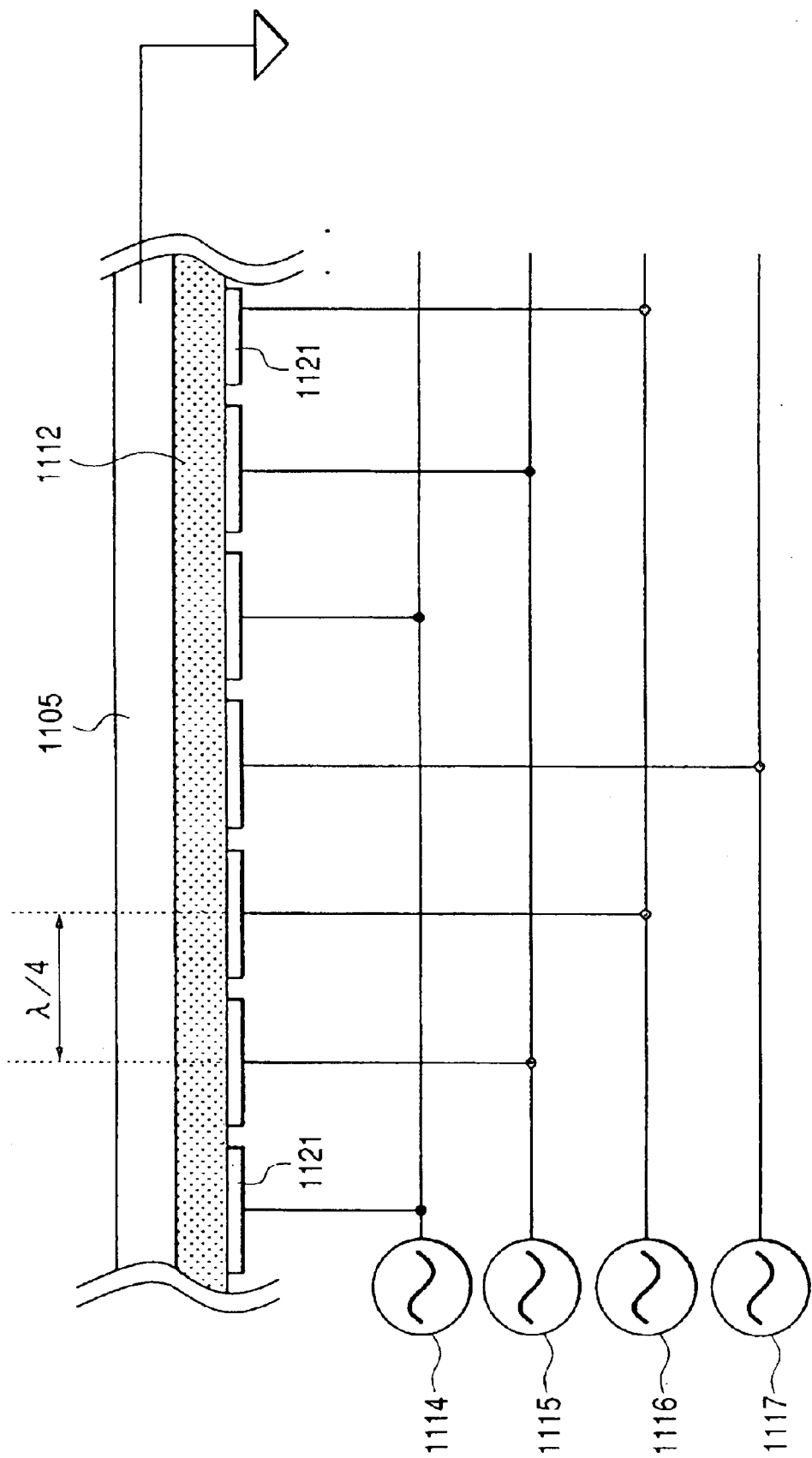
FIG. 27 is a view showing a piezoelectric element for a vibration member to which the present invention is applied and an arrangement for applying driving voltages.

FIGS. 26 and 27 are views showing a piezoelectric element for a vibration member to which this embodiment is applied and an arrangement for applying a driving voltage.

FIG. 26 shows an arrangement for generating a standing wave vibration. In this arrangement, a piezoelectric element 1104 is polarized in the same direction, voltages to be applied to electrodes 1119 arranged at a pitch of λ/2 are changed at a pitch of λ/2, and positive and negative sine voltages are applied to adjacent electrodes.

This arrangement includes the piezoelectric element 1104, and an elastic member 1105 made of a material such as a metal which exhibits small damping of vibrations. A vibration member is formed by bonding the piezoelectric element to one surface of the elastic member with an adhesive or the like. AC driving signals 1107 and 1106 are used to output positive and negative sine waves. The signs "+" and "−" on the piezoelectric element indicate whether the piezoelectric element expands or contracts in the horizontal direction upon application of a positive voltage in a direction perpendicular to the drawing surface.

In the case shown in FIG. 26, bending vibrations are produced in the elastic member. At this time, the polarization direction or voltage may be changed around an antinode position. Therefore, a node position of a standing wave can be used to drive another standing wave having a phase difference of 90°.

FIG. 27 shows an arrangement for generating a traveling wave vibration. In this arrangement, a piezoelectric element 1112 is polarized in the same direction, and electrodes 1121 are formed at a pitch of λ/4. Four-phase AC voltages 1114, 1115, 1116 and 1117 are sequentially applied to four electrodes existing in the range of λ, and these four-phase AC voltages 1114, 1115, 1116, and 1117 are driven with phase differences of 0°, 90°, 180°, and 270°.

Seventh Embodiment

Figure 23:
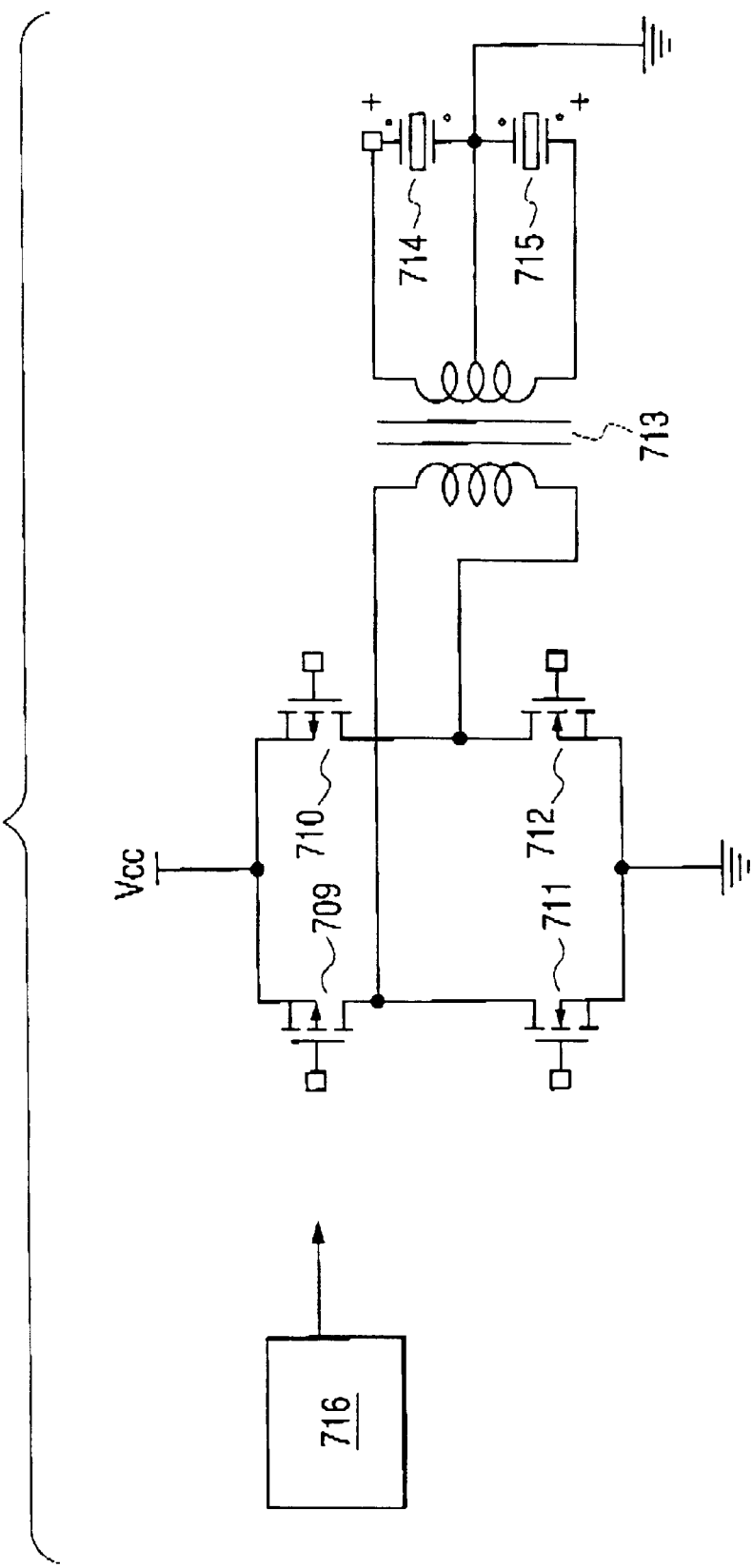
FIG. 23 is a circuit diagram showing the seventh embodiment of the present invention.

FIG. 23 is a circuit diagram showing the seventh embodiment of the present invention.

This embodiment includes switching elements 709 to 712 such as MOSFETs, a transformer 713 having a center tap on the secondary side, driving phases 714 and 715 spatially arranged at intervals of ½ the wavelength of resonance vibrations, and a pulse generating circuit 716 for driving the switching elements.

The operation of the bridge circuit constituted by the four FETs 709 to 712 is the same as that in the sixth embodiment, and hence a description thereof will be omitted. If a vibration member has a common electrode such as a ground electrode, the first embodiment takes the form in which one of the two inductors on the secondary side which has a polarity opposite to that on the primary side is connected and shared. If a connection is made as shown in FIG. 23 with the shared electrode serving as a center tap, the resultant circuit is equivalent to the circuit shown in FIG. 20. The positive sides of the driving phases are connected to the two ends of the inductor on the secondary side. In this case, the number of terminals becomes smaller than that in the circuit shown in FIG. 20, and hence a reduction in size can be attained. In addition, since components are coupled more closely, an output with the characteristics between the two phases being matched can be obtained. Furthermore, an improvement in efficiency can be expected.

Eighth Embodiment

Figure 24:
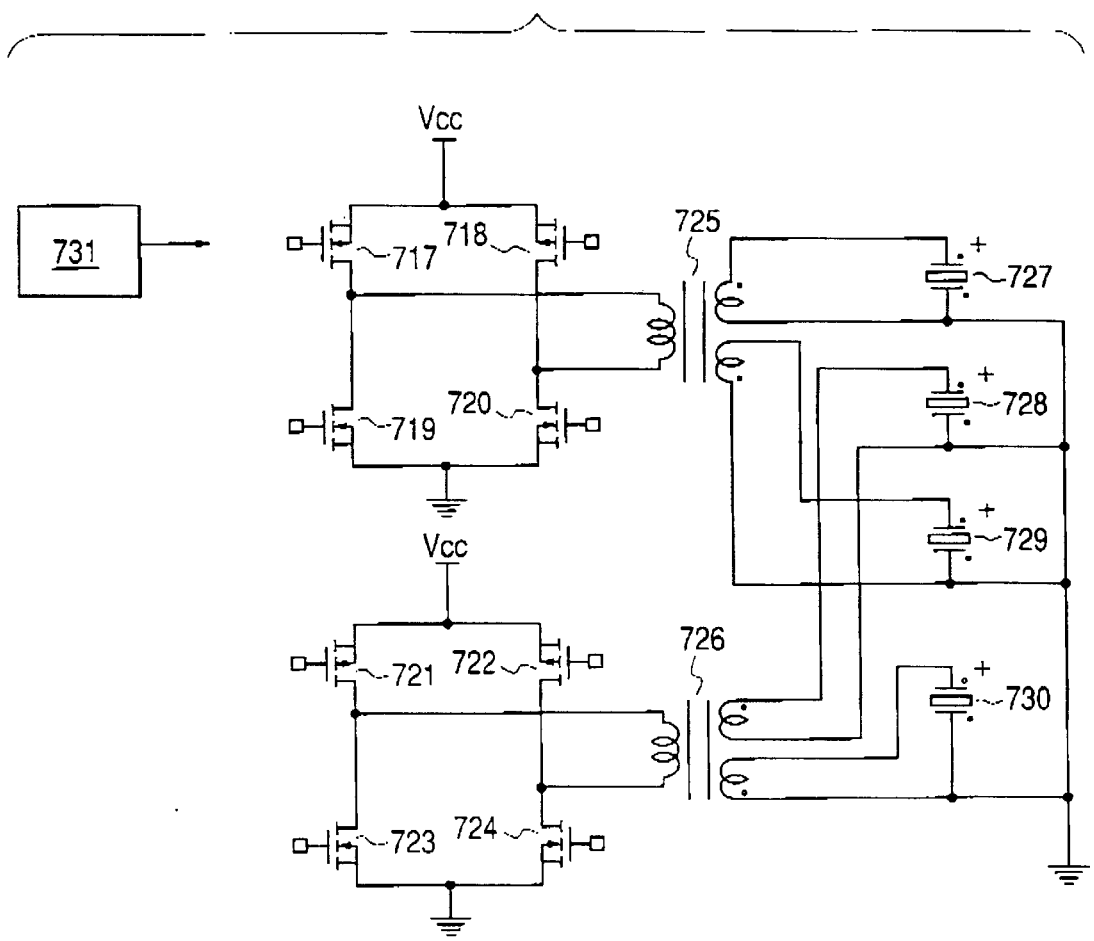
FIG. 24 is a circuit diagram showing the eighth embodiment of the present invention.

FIG. 24 is a circuit diagram showing the eighth embodiment of the present invention.

This circuit is a circuit for driving a vibration member with a traveling waveform like that shown in FIG. 27.

Referring to FIG. 24, this circuit includes MOSFETs 717 to 724, transformers 725 and 726 each having two inductors on the secondary side, driving phases 727 to 730 spatially arranged at intervals of ¼ the wavelength of resonance vibrations, and a pulse generating circuit 731 for driving the switching elements.

The operation of each of the bridge circuits constituted by the four FETs 717 to 720 and four FETs 721 to 724 is the same as that in the first embodiment, and hence a description thereof will be omitted.

The two bridge circuits are driven with a temporal phase difference of 90°. That is, the transformer 725 drives driving phases with spatial phases of 0° and 180° to generate a standing wave, whereas the transformer 726 drives driving phases with spatial phases of 90° and 270° to generate a standing wave. The two standing waves have a temporal/spatial phase difference of 90°. When, therefore, they are synthesized, a traveling wave is excited in the vibration member.

Letting fre be the parallel resonance of the secondary-side inductance of the transformer of this circuit and the driving phase, fr be the resonance frequency of the vibration element, and fs be the frequency at which the vibration amplitude of the vibration element increases for the first time in a region higher than the frequency fr, all the inductances are set to satisfy $$fr<fre/\sqrt{2}<fs$$

As a consequence, letting fd be a driving frequency, the traveling wave vibration member can be efficiently driven in the range defined by $$fr<fd<fs$$

FIG. 27 shows a linear vibration element. If the two ends of this element are located at infinity, an ideal traveling wave can be excited.

At this time, if a moving member (slider) serving as a contact member is brought into contact with the moving member with an appropriate pressure, linear motion can be produced in the slider by the frictional force between the vibration member and the slider.

Figure 28:
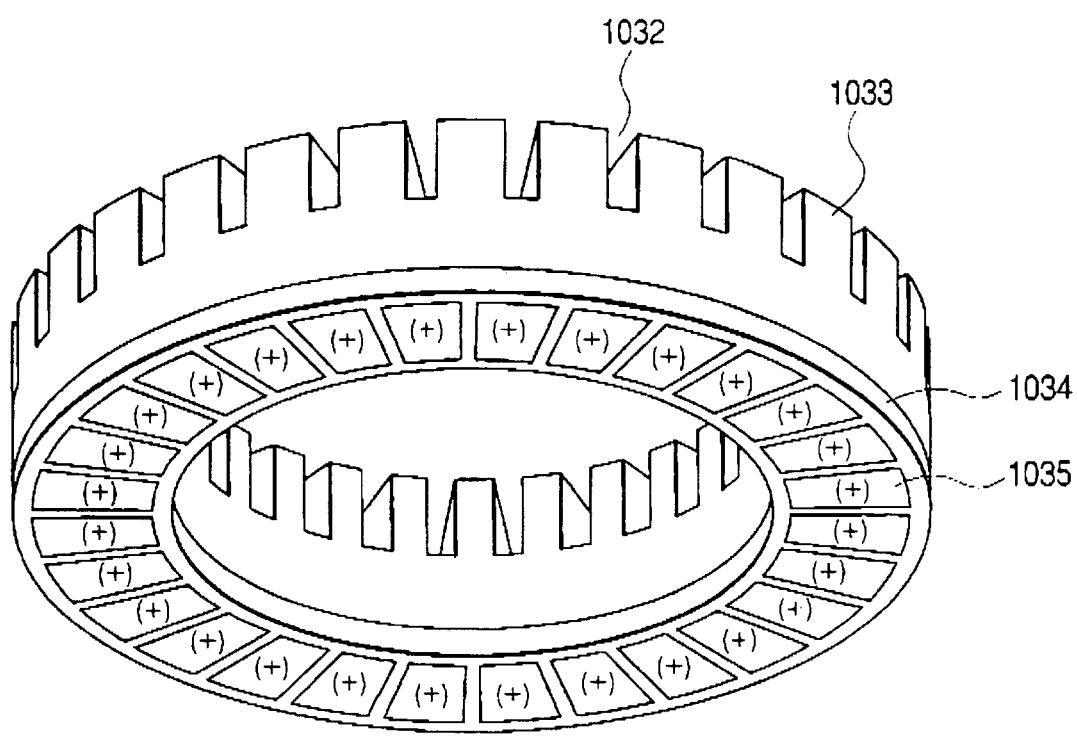
FIG. 28 is a view showing the structure of a vibration member to which the present invention is applied.

In addition, as shown in FIG. 28, if such a traveling wave type vibration member is formed into an annular shape and a traveling wave is formed therein, a rotating traveling wave can be generated.

Referring to FIG. 28, grooves 1032 each having an appropriate size are formed in a ring-like vibration member 1033 formed by an elastic member such as a metal to increase displacement by reducing rigidity. A ring-like piezoelectric element 1034 is uniformly polarized along the axis of the ring in FIG. 28. Electrodes 1035 are arranged at a pitch of ¼ of wavelength λ of the resonance frequency of the vibration member.

By pressing the ring-like slider against the vibration member, rotational motion can be extracted.

According to the present invention, driving operation can be efficiently performed by using the driving circuit shown in FIG. 24 with a driving frequency fd falling within the range defined by $$fr<fd<fs$$

Note that FIG. 24 shows a full bridge circuit as a typical example of a switching circuit. However, the same circuit settings as those of this embodiment of the present invention can be applied to any circuit as long as it can turn on/off a current flowing on the primary side of a transformer at a predetermined frequency.

In addition, the frequency fre may be adjusted to a value that can be easily adjusted by using an external inductor or capacitor.

If such an actuator is combined with a position sensor such as a rotary encoder and feedback control is performed, sophisticated control can be realized. In this case, if control is performed by using the driving frequency fd in the range defined by fr<fd<fs, both a wide dynamic range and high precision can be attained.

What is claimed is:

1. A driving apparatus of a four-phase driving vibration type actuator for applying four-phase AC signals having temporal phase differences to four-phase driving phases arranged on an electro-mechanical energy conversion element of a vibration member at intervals of ¼ wavelength of a resonance vibration, thereby forming a traveling wave by synthesizing a standing wave formed by one pair of two-phase driving phases at a position of a half wavelength with a standing wave formed by the other pair of two-phase driving phases, comprising:

a pulse signal generating circuit for generating a pulse signal in accordance with a driving frequency;

a first switching circuit for outputting an AC voltage to a first transformer by ON/OFF-controlling a switching element in accordance with the pulse signal output by said pulse signal generating circuit; and a second switching circuit for outputting an AC voltage to a second transformer by ON/OFF-controlling the switching element in accordance with the pulse signal output by said pulse signal generating circuit, wherein each phase of said one pair of two-phase driving phases respectively is connected to one of two ends of a secondary side of the first transformer, each phase of said other pair of two-phase driving phases respectively is connected to one of two ends of a secondary side of the second transformer, and said pulse signal generating circuit outputs to said first and second switching circuits pulse signals having a phase difference of 90°.

2. An apparatus according to claim 1, wherein the primary sides of said first and second transformers respectively are connected to said first and second switching circuits, and respective grounded center taps are formed on the secondary side of each of said first and second transformers.

3. An apparatus according to claim 1, wherein said first and second switching circuits are formed into a bridge circuit using a plurality of switching elements, and alternately switch directions of currents flowing in respective primary sides of said first and second transformers at a driving frequency, thereby generating two-phase AC signals in each of said first and second transformers.

4. An apparatus according to claim 1, wherein said first and second transformers have respective center taps formed on primary windings thereof and are connected to DC power supplies, switching elements are connected to the two ends of respective primary sides of said first and second transformers to form first and second switching circuits, and pulse signals having a temporal phase shift of 180° are supplied to the pair of switching elements of said first and second switching circuits to generate two-phase AC signals in each of said first and second transformers.

5. An apparatus according to claim 1, wherein said first and second transformers have respective center taps formed on primary windings thereof and are connected to DC power supplies, a switching element is connected to one end of a primary side of each of said first and second transformers and a diode is connected to the other end of the primary side to form first and second switching circuits, and the switching elements of said first and second switching circuits are driven to generate two-phase AC signals in each of said first and second transformers.

6. An apparatus according to claim 1, wherein one end of a primary side of each of said first and second transformers is connected to a DC power supply and the other end of the primary side is connected to the switching element to form said first and second switching circuits, and the switching elements of said first and second switching circuits are driven to generate two-phase AC signals in each of said first and second transformers.

7. An apparatus according to claim 2, wherein each of said first and second transformers is adjusted such that a coupling coefficient of coils extending from the center tap of a secondary winding to terminals of two ends of the coils and the primary side of each of said first and second transformers is substantially equal to an inductance value of the coils extending from the center tap of the secondary winding to the terminals of the two ends of the coils.

8. An apparatus according to claim 1, wherein each of said first and second transformers has secondary windings wound in a stacked state in the same space partitioned by a wall portion, and the respective number of turns of inner and outer coils are variable so as to differ from each other in order to adjust an inductance value.

9. An apparatus according to claim 7, wherein said first and second transformers are wound by bifilar winding and have respective center taps.

10. An apparatus according to claim 1, wherein primary sides of said first and second transformers respectively are connected to said first and second switching circuits, one electrode of said one pair of two-phase driving phases is connected to the secondary side of said first transformer, one electrode of said other pair of two-phase driving phases is connected to the secondary side of said second transformer, and respective other electrodes of said one pair and said other pair of driving phases are connected to each other.

11. A driving apparatus of a vibration type actuator for generating a standing wave by applying an AC signal to an electro-mechanical energy conversion element of a vibration member, comprising:

a transformer for outputting an AC voltage; and an inductor formed on a secondary side of said transformer, said transformer being set to satisfy $$fr<(fre/\sqrt{2})<fs$$

where fre is a parallel resonance frequency of an inductance of said inductor and a capacitance of the electro-mechanical energy conversion element, fr is a resonance frequency of the vibration member, and fs is a frequency at which a vibration amplitude of the vibration member increases for the first time in a region higher than the resonance frequency fr.

12. A driving apparatus of a vibration type actuator for generating a standing wave by applying two-phase AC signals having a temporal phase difference of 180° to two-phase driving phases arranged on an electro-mechanical energy conversion element of a vibration member at intervals of ½ wavelength of resonance vibrations, comprising:

a transformer for outputting an AC voltage, said transformer including two inductors on a secondary side of said transformer to drive two-phase driving phases, and being set to satisfy $$fr<(fre/\sqrt{2})<fs$$

where fre is a parallel resonance frequency of an inductance of one of said inductors and a capacitance of one phase of the electro-mechanical energy conversion element, fr is a resonance frequency of the vibration member, and fs is a frequency at which a vibration amplitude of the vibration member increases for the first time in a region higher than the resonance frequency fr.

13. A driving apparatus of a vibration type actuator for generating a standing wave by applying an AC signal to an electro-mechanical energy conversion element of a vibration member, comprising:

a transformer for outputting an AC voltage; and an inductor formed, on a secondary side of said transformer, said transformer being set to satisfy $$fr<(fre/\sqrt{2})<fs$$

where fre is a parallel resonance frequency of an inductance of the inductor and a sum of a capacitance of the electro-mechanical energy conversion element and a capacitance of an adjustment capacitor, fr is a resonance frequency of the vibration member, and fs is a frequency at which a vibration amplitude of the vibration member increases for the first time in a region higher than the resonance frequency fr.

14. A driving apparatus of a vibration type actuator for generating a standing wave by applying two-phase AC signals having a temporal phase difference of 180° to two-phase driving phases arranged on an electro-mechanical energy conversion element of a vibration member at intervals of ½ wavelength of resonance vibrations, comprising:

a transformer for outputting an AC voltage, said transformer including two inductors on a secondary side of said transformer to drive two-phase driving phases and an adjustment capacitor added thereto, said transformer being set to satisfy $$fr<(fre/\sqrt{2})<fs$$

where fre is a parallel resonance frequency of an inductance of one of said two inductors and a sum of a capacitance of one phase of the electro-mechanical energy conversion element and a capacitance of the adjustment capacitor connected to said one phase of the electro-mechanical energy conversion element, fr is a resonance frequency of the vibration member, and fs is a frequency at which a vibration amplitude of the vibration member increases for the first time in a region higher than the resonance frequency fr.

15. A driving apparatus of a vibration driving type actuator for forming a traveling wave by synthesizing a standing wave formed by one pair of two-phase driving phases with a standing wave formed by the other pair of two-phase driving phases, each standing wave having a positional relationship relative to the other standing wave represented by a half wavelength with respect to a wavelength of resonance vibrations, by applying four-phase AC signals having temporal phase differences from each other to four-phase driving phases arranged on an electro-mechanical energy conversion element of a vibration member at intervals of ¼ wavelength of the resonance vibrations, comprising:

first and second transformers for generating AC voltages, said first and second transformers respectively having two inductors formed on secondary sides thereof to drive two-phase driving phases, and being set to satisfy $$fr<(fre/\sqrt{2})<fs$$

where fre is a parallel resonance frequency of an inductance of one of said inductors and a capacitance of one phase of the electro-mechanical energy conversion element, fr is a resonance frequency of the vibration member, and fs is a frequency at which a vibration amplitude of the vibration member increases for the first time in a region higher than the resonance frequency fr.

16. A driving apparatus of a vibration type actuator for forming a traveling wave by synthesizing a standing wave formed by one pair of two-phase driving phases with a standing wave formed by the other pair of two-phase driving phases, each standing wave having a positional relationship relative to the other standing wave represented by a half wavelength with respect to a wavelength of resonance vibrations, by applying four-phase AC signals having temporal phase differences from each other to four-phase driving phases arranged on an electro-mechanical energy conversion element of a vibration member at intervals of ¼ the wavelength of resonance vibrations, comprising:

first and second transformers for generating AC voltages, said first and second transformers respectively including two inductors formed on secondary sides thereof to drive two-phase driving phases and adjustment capacitors added thereto, said first and second transformers being set to satisfy $$fr<(fre/\sqrt{2})<fs$$

where fre is a parallel resonance frequency of an inductance of one of said inductors and a sum of a capacitance of one phase of the electro-mechanical energy conversion element and a capacitance of an adjustment capacitor connected to said one phase of the electro-mechanical energy conversion element, fr is a resonance frequency of the vibration member, and fs is a frequency at which a vibration amplitude of the vibration member increases for the first time in a region higher than the resonance frequency fr.

17. An apparatus according to claim 12, wherein a pair of terminals of the two inductors on the secondary side of said transformer that have a polarity different from that of a primary side of said transformer are connected to each other and shared.

18. An apparatus according to claim 15, wherein a pair of terminals of the two inductors on the respective secondary sides of said two transformers that have a polarity different from that of a primary side of said transformers are connected to each other and shared.

19. An apparatus according to claim 17, wherein said transformer has a center tap formed on said one inductor on the secondary side.

20. A driving apparatus of a vibration type actuator for generating a standing wave by applying an AC signal to an electro-mechanical energy conversion element of a vibration member, comprising:

a transformer for outputting an AC voltage, said transformer including a first inductor on a secondary side connected to a predetermined phase of said electro-mechanical energy conversion element and a second inductor connected to a phase of said electro-mechanical energy conversion element shifted from said predetermined phase by 180°, said transformer being set to satisfy $$fr < (fre/\sqrt{2}) < fs$$

wherein fre is a parallel resonance frequency of an inductance of said first inductor and a capacitance of said predetermined phase of said electro-mechanical energy conversion element, or a parallel resonance frequency of an inductance of said second inductor and a capacitance of said phase of said electro-mechanical energy conversion element shifted from said predetermined phase by 180°, fr is a resonance frequency of said vibration member, and fs is a frequency at which a vibration amplitude of said vibration member increases for the first time in a region higher than said resonance frequency fr.

21. A driving apparatus of a vibration type actuator for generating a standing wave by applying an AC signal to an electro-mechanical energy conversion element of a vibration member, comprising:

a transformer for outputting an AC voltage;

a first adjustment capacitor connected to a first phase of said electro-mechanical energy conversion element; and a second adjustment capacitor connected to a second phase of said electro-mechanical energy conversion element and shifted from said first phase by 180°, wherein said transformer includes a first inductor on a secondary side connected to the first phase of said electro-mechanical energy conversion element and a second inductor connected to the second phase of said electro-mechanical energy conversion element, said transformer being set to satisfy $$fr < (fre/\sqrt{2}) < fs$$

wherein fre is a parallel resonance frequency of an inductance of said first inductor and a sum of a capacitance of said first phase of said electro-mechanical energy conversion element and a capacitance of said first adjustment capacitor, or a parallel resonance frequency of an inductance of said second inductor and a sum of a capacitance of said second phase of said electro-mechanical energy conversion element and a capacitance of said second adjustment capacitor, fr is a resonance frequency of said vibration member, and fs is a frequency at which a vibration amplitude of said vibration member increases for the first time in a region higher than said resonance frequency fr.

* * * * *

UNITED STATES PATENT AND TRADEMARK OFFICE
CERTIFICATE OF CORRECTION

PATENT NO. : 6,724,607 B2
DATED : April 20, 2004
INVENTOR(S) : Tadashi Hayashi et al.

It is certified that error appears in the above-identified patent and that said Letters Patent is hereby corrected as shown below:

Column 12,
Line 46, "higest" should read -- highest --.

Column 17,
Line 39, "formed," should read -- formed --.

Column 19,
Line 24, "wherein" should read -- where --.

Column 20,
Line 21, "wherein" should read -- where --.

Signed and Sealed this

Fourteenth Day of December, 2004

JON W. DUDAS
*Director of the United States Patent and Trademark Office*